(12) United States Patent
Jang

(10) Patent No.: US 9,207,890 B2
(45) Date of Patent: Dec. 8, 2015

(54) METHOD AND SYSTEM FOR PROVIDING CONTENTS OR SMART PRINT SERVICE OF SMART PRINTER MAPPED TO NETWORK ACCESS DEVICE

(71) Applicant: PeopleBee Inc., Seoul (KR)

(72) Inventor: In Ji Jang, Seoul (KR)

(73) Assignee: PeopleBee Inc., Seoul (KR)

( * ) Notice: Subject to any disclaimer, the term of this patent is extended or adjusted under 35 U.S.C. 154(b) by 0 days.

(21) Appl. No.: 14/598,172

(22) Filed: Jan. 15, 2015

(65) Prior Publication Data

US 2015/0199156 A1 Jul. 16, 2015

(30) Foreign Application Priority Data

Jan. 15, 2014 (KR) .......... 10-2014-0005289
Jan. 15, 2014 (KR) .......... 10-2014-0005290

(51) Int. Cl.
G06F 15/00 (2006.01)
G06F 3/12 (2006.01)
G06K 1/00 (2006.01)
H04L 29/08 (2006.01)
H04L 12/28 (2006.01)
H04W 4/02 (2009.01)
H04W 88/08 (2009.01)

(52) U.S. Cl.
CPC ............ *G06F 3/1232* (2013.01); *G06F 3/1204* (2013.01); *G06F 3/1236* (2013.01); *G06F 3/1292* (2013.01); *H04L 67/16* (2013.01); *H04L 12/2807* (2013.01); *H04L 67/18* (2013.01); *H04W 4/02* (2013.01); *H04W 88/08* (2013.01)

(58) Field of Classification Search
USPC .................................. 358/1.1–1.18
See application file for complete search history.

(56) References Cited

U.S. PATENT DOCUMENTS 8,351,408 B2 * 1/2013 Daigle .......................... 370/338
2012/0246569 A1 * 9/2012 Liu et al. ....................... 715/738

* cited by examiner

*Primary Examiner* — Douglas Tran
(74) *Attorney, Agent, or Firm* — Marshall, Gerstein & Borun LLP

(57) ABSTRACT

A method for providing a smart print service of a smart printer mapped to a network access device and a method for providing contents mapped to the network access device are provided.

15 Claims, 16 Drawing Sheets

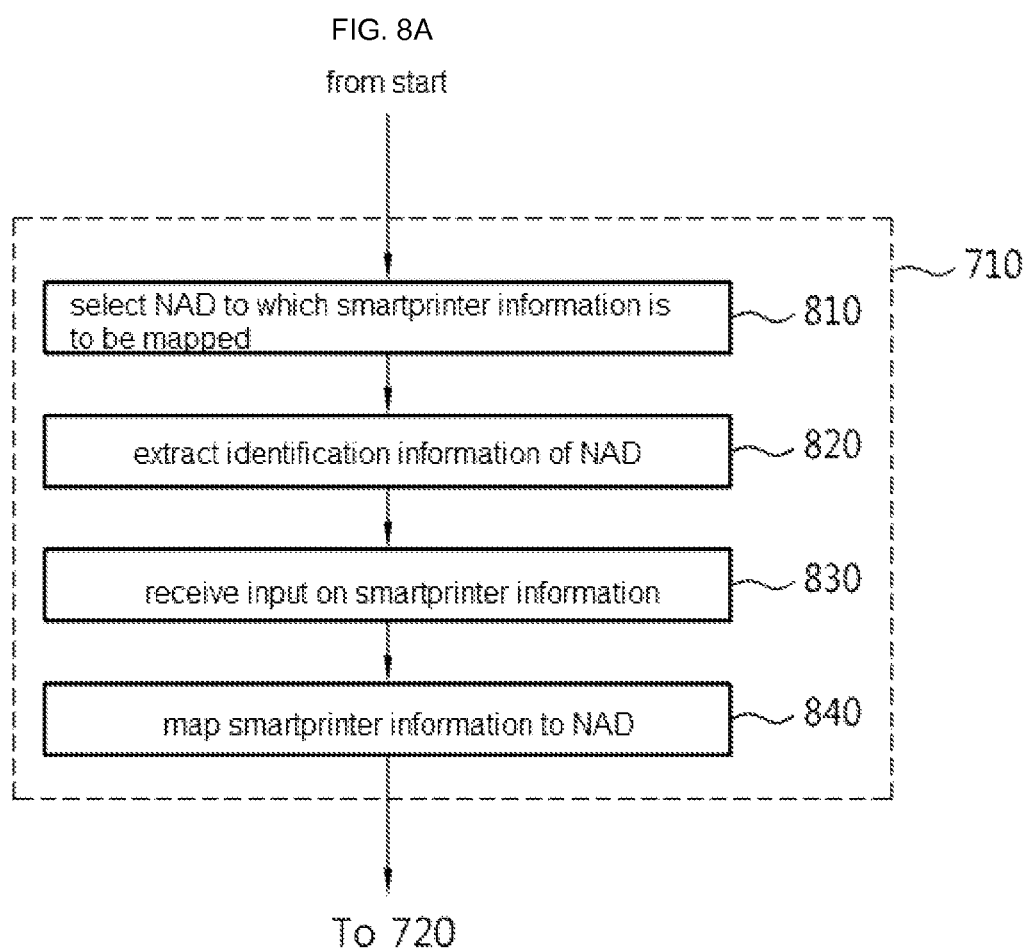

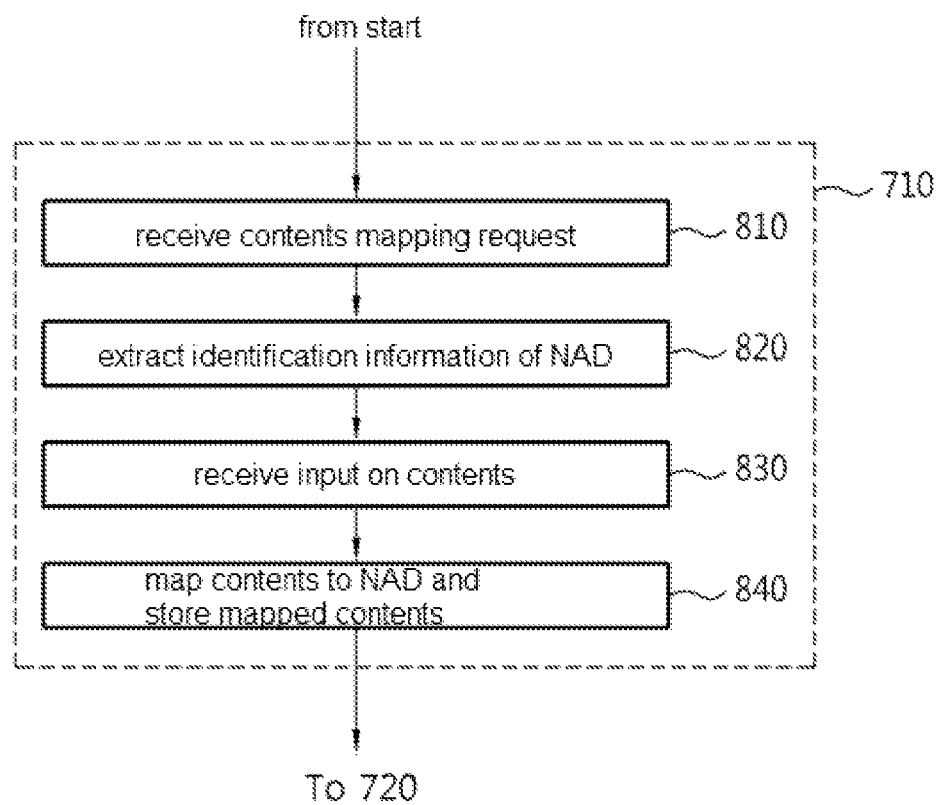

METHOD AND SYSTEM FOR PROVIDING CONTENTS OR SMART PRINT SERVICE OF SMART PRINTER MAPPED TO NETWORK ACCESS DEVICE

CROSS-REFERENCE TO RELATED APPLICATIONS

A claim for priority under 35 U.S.C. §119 is made to Korean Patent Application No. 10-2014-0005289 filed Jan. 15, 2014, and Korean Patent Application No. 10-2014-0005290 filed Jan. 15, 2014 in the Korean Intellectual Property Office, the entire contents of which are hereby incorporated by reference.

BACKGROUND

Embodiments of the inventive concepts described herein relate to a system and a method capable of providing contents and a smart print service of a smart printer mapped to a network access device.

In particular, the inventive concept maps contents to the network access device and provides the mapped contents to a user wireless device in response to a request of the user wireless device. Also, the inventive concept maps smart printer information to the network access device and provides the mapped smart printer information to the user wireless device in response to a request of the user wireless device, thereby allowing the user wireless device to use a smart printer by means of the smart printer information.

With the advancement of user wireless devices as portable wireless devices including a tablet and smart phone, a service platform that provides contents based on location information of the user wireless device has emerged. In detail, the service platform that provides contents based on location information of the user wireless device may provide the user wireless device with contents around the GPS coordinates where the user wireless device exists.

As described above, the conventional service platform maintains database in which contents are mapped to the GPS coordinates and provides contents based on location information of the user wireless device. However, the conventional service platform may not use the network access device as a source for mapping and providing contents. In particular, the conventional service platform uses the network access device only for communications of the user wireless device, while it does not at all use the network access device to map contents and to provide the mapped contents.

Also, in a technique that allows a conventional user wireless device to use a printer, the user wireless device is provided with a printer driver as information on a usable printer and uses the printer based on the printer driver. However, a conventional technique may cause the following problem: a user of a user wireless device uses a printer far away from a current location because location information of the user wireless device is not at all considered. In particular, in the conventional technique, the network access device that exists in a space where the user wireless device is placed is not used as a source that maps printer information and provides the mapped printer information to the user wireless device.

Thus, in this specification, a technique is described which uses the network access device as a printer providing source when information on a printer is mapped and the mapped information is provided to the user wireless device.

SUMMARY

Embodiments of the inventive concept provide a user interface of a user wireless device capable of providing information on a printer to a user wireless device, thereby making it possible for a user of the user wireless device to use the printer considering location information of the user wireless device.

Embodiments of the inventive concept provide a method, device, and system capable of using a network access device as a printer providing source, thereby making it possible to map information on a printer and to provide a user wireless device with the mapped information on the printer.

Embodiments of the inventive concept provide a method, device, and system capable of mapping information on a printer to a network access device using identification information of the network access device.

Embodiments of the inventive concept provide a method, device, and system capable of providing a user wireless device with information on a printer mapped to a network access device using identification information of the network access device.

Embodiments of the inventive concept provide a method, device, and system capable of using a network access device as a contents providing source, thereby making it possible to map contents and to provide a user wireless device with the mapped contents.

Embodiments of the inventive concept provide a method, device, and system capable of mapping contents to a network access device using identification information of the network access device.

Embodiments of the inventive concept provide a method, device, and system capable of providing a user wireless device with contents mapped to a network access device using identification information of the network access device.

Embodiments of the inventive concept provide a user interface of a user wireless device capable of mapping contents to a network access device and providing the mapped contents.

One aspect of embodiments of the inventive concept is directed to provide a method for providing a smart print service of a smart printer mapped to a network access device. The method may include receiving a request on smart printer information mapped to at least one network access devices from a user wireless device; searching for smart printer information mapped to identification information of the at least one network access devices based on the identification information of the at least one network access devices; and providing the found smart printer information to the user wireless device.

Another aspect of embodiments of the inventive concept is directed to provide a method for providing contents mapped to a network access device. The method may include receiving a request on contents mapped to identification information of at least one network access devices from a user wireless device; searching for contents mapped to the identification information of the at least one network access device, based on the identification information of the at least one network access devices; and providing the found contents to the user wireless device.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 8A is a detailed flow chart showing a step of mapping smart printer information to identification information of at least one network access device shown in FIG. 7A; and FIG. 8B is a detailed flow chart showing a step of mapping contents to identification information of at least one network access device shown in FIG. 7B.

DETAILED DESCRIPTION

Figure 1A:
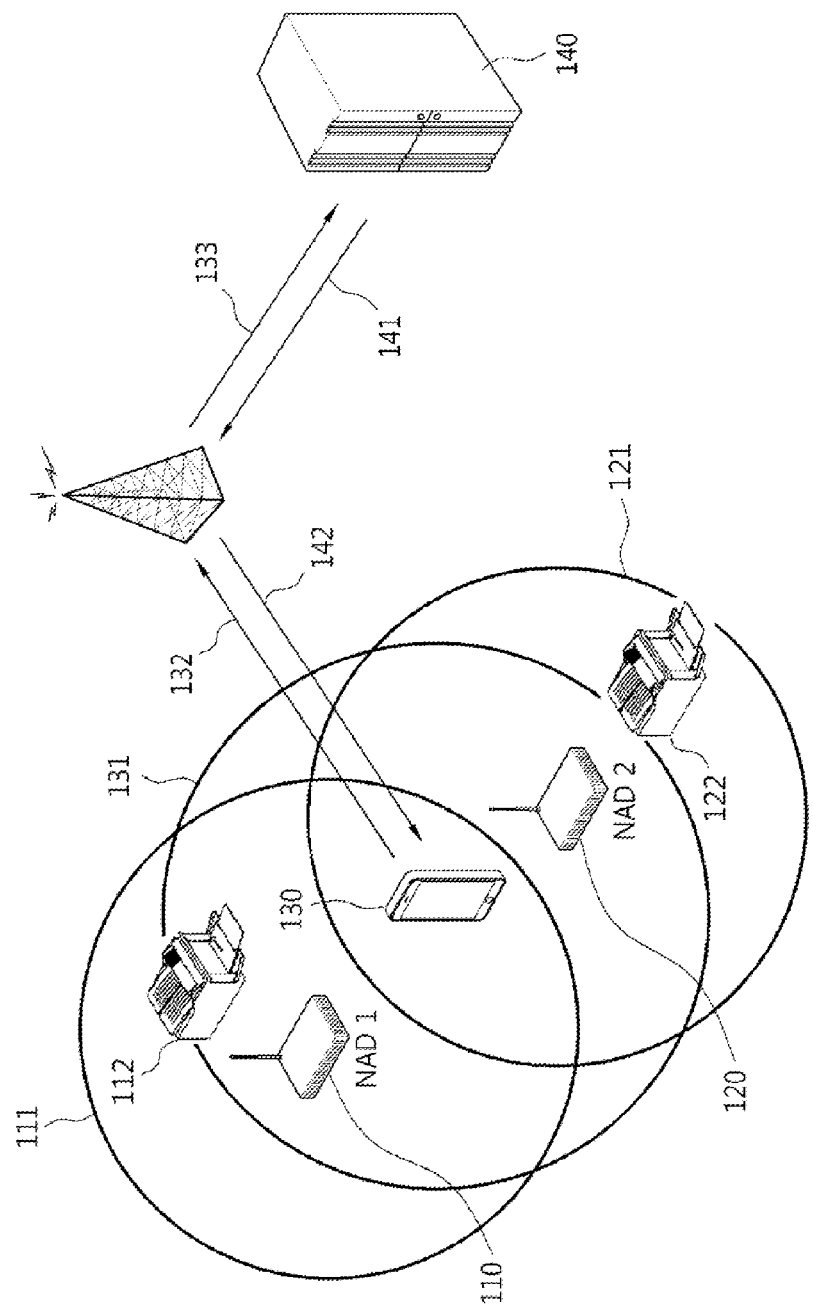
FIG. 1A is a diagram showing a system which provides a smart print service of a smart printer mapped to a network access device, according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

The meaning of the term "or" used herein includes any or all combinations of the words connected by the term "or". For instance, the expression "A or B" may indicate include A, B, or both A and B.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1A is a diagram showing a system which provides a smart print service of a smart printer mapped to a network access device, according to an exemplary embodiment of the inventive concept.

Referring to FIG. 1A, a system according to an exemplary embodiment of the inventive concept provides a smart print service of a smart printer mapped to a network access device and contains at least one network access devices 110 and 120, a global mapping server 140 linked with the at least one network access devices 110 and 120, a user wireless device 130 linked with the global mapping server 140, and at least one smart printers 112 and 122 to be used by the user wireless device 130. Below, a system that provides a smart print service of a smart printer mapped to at least one network access devices may be referred to as "system". Here, that the at least one network access devices 110 and 120 and the global mapping server 140 are connected to each other may mean that the at least one network access devices 110 and 120 and the global mapping server 140 are connected through a communication link or that the global mapping server 140 recognizes existence of the at least one network access devices 110 and 120. In addition, the user wireless device 130 is connected with the at least one network access devices 110 and 120 through a communication link.

The system according to an exemplary embodiment of the inventive concept may use the at least one network access devices 110 and 120 as a source for providing a smart printer (hereinafter referred to as "smart printer providing source"). In particular, the global mapping server 140 that the system includes maps smart printer information for using the at least one network access devices 110 and 120 to identification information of the at least one network access devices 110 and 120 and provides the user wireless device 130 with the smart printer information mapped to the identification information of the at least one network access devices 110 and 120 placed in a smart space 131 of the user wireless device 130, thereby allowing the user wireless device 130 to use the at least one smart printers 112 and 122 based on the smart printer information. At this time, the smart space 131 may be a space where the user wireless device 130 searches for a network access device through wireless scanning and may vary with location information of the user wireless device 130. Also, the smart space 131 may mean a range which is predetermined according to GPS information of the user wireless device 130.

An exemplary embodiment of the inventive concept is exemplified as the global mapping server 140 is a single server. However, the scope and spirit of the inventive concept may not be limited thereto. For example, the global mapping server 140 may be formed of a printer mapping server, which stores smart printer information for using the at least one smart printers 112 and 122 mapped to the identification information of the at least one network access devices 110 and 120, and a printer providing server which is provided with the smart printer information mapped to the identification information of the at least one network access devices 110 and 120 placed in the smart space 131 of the user wireless device 130 from the printer mapping server. Also, upon mapping the smart printer information to the identification information of the at least one network access devices 110 and 120, the printer mapping server uses the printer server in which the smart printer information is previously stored, without acquiring the smart printer information from the at least one smart printers 112 and 122. At this time, the printer server may be disposed in the printer mapping server or in the at least one smart printers 112 and 122. Here, the smart printer information may be an IP address of a device that receives and processes a print request. For example, the smart printer information may be IP addresses of the at least one smart printers 112 and 122 that are essential information needed to use at least one smart printer. In addition, the smart printer information may further include an ID and a password for authorizing a restrictive permission on the at least one network access devices 110 and 120, which will be more fully described with reference to FIG. 3A. The smart printer information may be an IP address of the printer server that processes a print request. For example, the smart printer information may be an IP address of the printer server in which pieces of IP information of the at least one smart printers 112 and 122 are stored. Thus, the global mapping server 140 may map the IP address of the printer server, which stores the IP information of the at least one smart printers 112 and 122, to the identification information of the at least one network access devices 110 and 120.

The global mapping server 140 maps smart printer information to the identification information of the at least one network access devices 110 and 120. Upon receiving a request on mapping of the smart printer information to the identification information of the at least one network access devices 110 and 120, the global mapping server 140 may map the smart printer information to the identification information of the at least one network access devices 110 and 120.

Also, before mapping the smart printer information to the identification information of the at least one network access devices 110 and 120, the global mapping server 140 may acquire the smart printer information and the identification information of the at least one network access devices 110 and 120 to which the smart printer information is to be mapped. For example, the global mapping server 140 may acquire the identification information of the at least one network access devices 110 and 120 using any other wireless device different from a user wireless device or may receive the identification information of the at least one network access devices 110 and 120 using the user wireless device 130. In addition, the global mapping server 140 may obtain the identification information of the at least one network access devices 110 and 120 from a request on the mapping of the smart printer information to the identification information of the at least one network access devices 110 and 120. The global mapping server 140 may receive and obtain the identification information of the at least one network access devices 110 and 120 from a device that sends a request on the mapping of the smart printer information to the identification information of the at least one network access devices 110 and 120. At this time, the device that sends a request on the mapping of the smart printer information to the identification information of the at least one network access devices 110 and 120 may be any other wireless device that differs from the user wireless device 130.

The global mapping server 140 selects a network access device that will map the smart printer information. For example, the network access device that will map the smart printer information may be selected such that smart printer information on the first smart printer 112 and smart printer information on the second smart printer 122 are mapped to the first network access device 110.

The global mapping server 140 selects a network access device, which will map the smart printer information, from among the at least one network access devices 110 and 120, according to the smart space 131 that is based on location information of the user wireless device 130. Since the first and second network access devices 110 and 120 all are placed in the smart space 131 as illustrated in FIG. 1A, the global mapping server 140 selects a network access device that will map a smart printer to one of the first and second network access devices 110 and 120. Thus, the smart printer information on the at least one smart printers 112 and 122 may be mapped to a network access device, which is adjacent to the at least one smart printers 112 and 122 in distance, from among the at least one network access devices 110 and 120. For example, the global mapping server 140 may select a network access device for mapping such that the smart printer information on the first smart printer 112 is mapped to the first network access device 110 adjacent to the first smart printer 112 and such that the smart printer information on the second smart printer 122 is mapped to the second network access device 120 adjacent to the second smart printer 122. This may be made to use a smart printer actually adjacent in distance by the user wireless device obtaining the smart printer information mapped to a network access device adjacent in distance using the smart space 131, when the at least one smart printers 112 and 122 are used according to the smart printer information mapped to the at least one network access devices 110 and 120.

Upon selecting a network access device that will map the smart printer information, the global mapping server 140 may consider communication coverages 111 and 121 of the at least one network access devices 110 and 120 as well as whether any one of the at least one network access devices 110 and 120 exists in the smart space 131 of the user wireless device 130. For example, the global mapping server 140 may select one, which will map the smart printer information, from among the at least one network access devices 110 and 120, based on whether the user wireless device 130 is placed in a communication coverage of any network access device of the communication coverages 111 and 121 of the at least one network access devices 110 and 120. Since the user wireless device 130 is placed in both the communication coverage 111 of the first network access device 110 and the communication coverage 121 of the second network access device 120 as illustrated in FIG. 1A, the global mapping server 140 selects one of the first and second network access devices 110 and 120 as a network access device that will map the smart printer information.

Also, the global mapping server 140 selects one, which will map the smart printer information, from among the at least one network access devices 110 and 120, based on a NAD selection input received from the user wireless device 130.

In addition, the global mapping server 140 obtains the smart printer information from a request on mapping of the smart printer information to the identification information of the at least one network access devices 110 and 120. Also, the global mapping server 140 receives and obtains the smart printer information from a device that sends a request on the mapping of the smart printer information to the identification information of the at least one network access devices 110 and 120.

The global mapping server 140 maps the smart printer information to the identification information of the at least one network access devices 110 and 120, based on the identification information of the at least one network access devices 110 and 120 and the smart printer information acquired through the above-described method.

The global mapping server 140 also extracts identification information of a selected network access device, receives smart printer information through a user interface of the user wireless device 130, and maps the received smart printer information to the identification information of the selected network access device.

At this time, smart printer information to be mapped to the identification information of the selected network access device is not only received through the user interface of the user wireless device 130, but also it is automatically loaded from the printer server. Here, the smart printer information may be previously stored at the printer server. This will be more fully described with reference to FIG. 3A.

The global mapping server 140 not only maps the smart printer information to identification information of a selected network access device, but it also maps the smart printer information to single identification information that is formed by combining the identification information of the selected network access device and identification information of a neighboring network access device, based on the identification information of the neighboring network access device adjacent to the selected network access device. This will be more fully described with reference to FIG. 4. Here, the term "neighboring" may not be limited to indicate a physically neighboring location.

For example, it is assumed that when a user wireless device is "A", pieces of identification information of network access devices that "A" can access (or, scan) at a current location (C) are "B". Meanwhile, information (pieces of identification information of network access devices) on the neighbor may be obtained by "A" requesting the information on the neighbor from the global mapping server 140 at the current location (C). At this time, the information on the neighbor obtained through the request is referred to as "N". The information (pieces of identification information of network access devices) on the neighbor "N" may be obtained or may not be obtained.

The global mapping server 140 automatically selects a network access device for mapping the smart printer information, based on location information of the user wireless device 130. Also, the global mapping server 140 directly receives identification information through the user interface of the user wireless device 130.

For example, the global mapping server 140 receives an input on identification information of a network access device, which will map smart printer information, from among the at least one network access devices 110 and 120 through the user interface, selects a network access device to which the smart printer information is to be mapped, and receives an input on the smart printer information, thereby making it possible to map the received smart printer information to the received identification information of the network access device.

In the event that the global mapping server 140 is divided into the printer mapping server and the printer providing server, the above-described procedure may be executed on the printer mapping server. A separate printer server in which smart printer information is previously stored may be used upon mapping the smart printer information to the identification information of the at least one network access devices 110 and 120.

After the above-described procedure is performed, the smart printer information that is mapped to the identification information of the at least one network access devices 110 and 120 is provided to the user wireless device 130. Likewise, in the event that the global mapping server 140 is divided into the printer mapping server and the printer providing server, the providing of the smart printer information to the user wireless device 130 may be executed on the printer providing server. The detailed procedure is as follows.

The global mapping server 140 receives a request on the smart printer information mapped to the identification information of the at least one network access devices 110 and 120 from the user wireless device 130. Here, the at least one network access devices 110 and 120 may be at least one of a plurality of network access devices that the user wireless device 130 can access at a location where the user wireless device 130 sends the request on the smart printer information. At this time, the global mapping server 140 receives the request on the smart printer information mapped to the identification information of the at least one network access devices 110 and 120 from the user wireless device 130 through a communication path (132, 133) that differs from a communication path between the at least one network access devices 110 and 120 and the user wireless device 130. For example, in the event that the at least one network access devices 110 and 120 and the user wireless device 130 communicate with each other through a Wi-Fi (Wireless Fidelity) communication path, the global mapping server 140 receives the request on the smart printer information mapped to the identification information of the at least one network access devices 110 and 120 from the user wireless device 130 through a mobile communication network (132, 133). Also, the global mapping server 140 receives the request on the mapped smart printer information using a separate communication protocol that differs from the communication protocol that the at least one network access devices 110 and 120 provide.

At this time, that the global mapping server 140 receives the request on the smart printer information mapped to the identification information of the at least one network access devices 110 and 120 from the user wireless device 130 may mean the selecting of the at least one network access devices 110 and 120 according to the smart space 131 that is based on location information of the user wireless device 130. Thus, the global mapping server 140 selects the at least one network access devices 110 and 120 according to the smart space 131 that is based on location information of the user wireless device 130. Here, the selecting of the at least one network access devices 110 and 120 according to the smart space 131 that is based on location information of the user wireless device 130 may mean the selecting of the at least one network access devices 110 and 120 to which the smart printer information on a smart printer adjacent to the user wireless device 130 is mapped. For this reason, the user wireless device 130 that is provided with the smart printer information mapped to the identification information of the at least one network access devices 110 and 120 may use a smart printer adjacent to a current location of the user wireless device 130. Since both the first network access device 110 and the second network access device 120 are placed in the smart space 131 as illustrated in FIG. 1A, the global mapping server 140 may select one of the first network access device 110 and the second network access device 120.

Also, the global mapping server 140 selects the at least one network access devices 110 and 120, based on a NAD selection input received from the user wireless device 130. For example, when a selection input on the first network access device 110 is received from the user wireless device 130, the global mapping server 140 selects the first network access device 110 of the at least one network access devices 110 and 120.

After selecting the at least one network access devices 110 and 120 in response to a received request on the smart printer information, the global mapping server 140 searches for smart printer information mapped to the identification information of the at least one network access devices 110 and 120, based on the identification information of the at least one network access devices 110 and 120. For example, upon receiving a request on smart printer information mapped to the identification information of the first network access device 110, the global mapping server 140 searches for smart printer information mapped to the identification information of the first network access device 110.

At this time, the global mapping server 140 further searches for smart printer information mapped to a neighboring network access device adjacent to the least one network access devices 110 and 120 in addition to smart printer information mapped to the least one network access devices 110 and 120 and provides it to the user wireless device 130. This will be more fully described with reference to FIG. 2.

Afterwards, the global mapping server 140 provides the found smart printer information to the user wireless device 130 through a communication path (141, 142) that differs from the communication path between the at least one network access devices 110 and 120 and the user wireless device 130. For example, in the event that the at least one network access devices 110 and 120 and the user wireless device 130 communicate with each other through a Wi-Fi communication path, the global mapping server 140 provides the found smart printer information to the user wireless device 130 through a mobile communication network (141, 142). Also, the global mapping server 140 provides the found smart printer information to the user wireless device 130 using a separate communication protocol that differs from the communication protocol that the at least one network access devices 110 and 120 provide.

At this time, the smart printer information provided to the user wireless device 130 may be displayed through the user interface of the user wireless device 130. This will be more fully described with reference to FIGS. 5A and 6A.

A smart printer may be used based on smart printer information that is provided from the global mapping server 140 to the user wireless device 130. For example, in response to the event that the global mapping server 140 provides the user wireless device 130 with smart printer information on the first smart printer 112 mapped to the identification information of the first network access device 110, the user wireless device 130 uses the first smart printer 112 according to the smart printer information on the first smart printer 112.

As described above, the system according to an exemplary embodiment of the inventive concept may use the at least one network access devices 110 and 120 as a printer providing source without using the at least one network access devices 110 and 120 as the communication means.

Figure 1B:
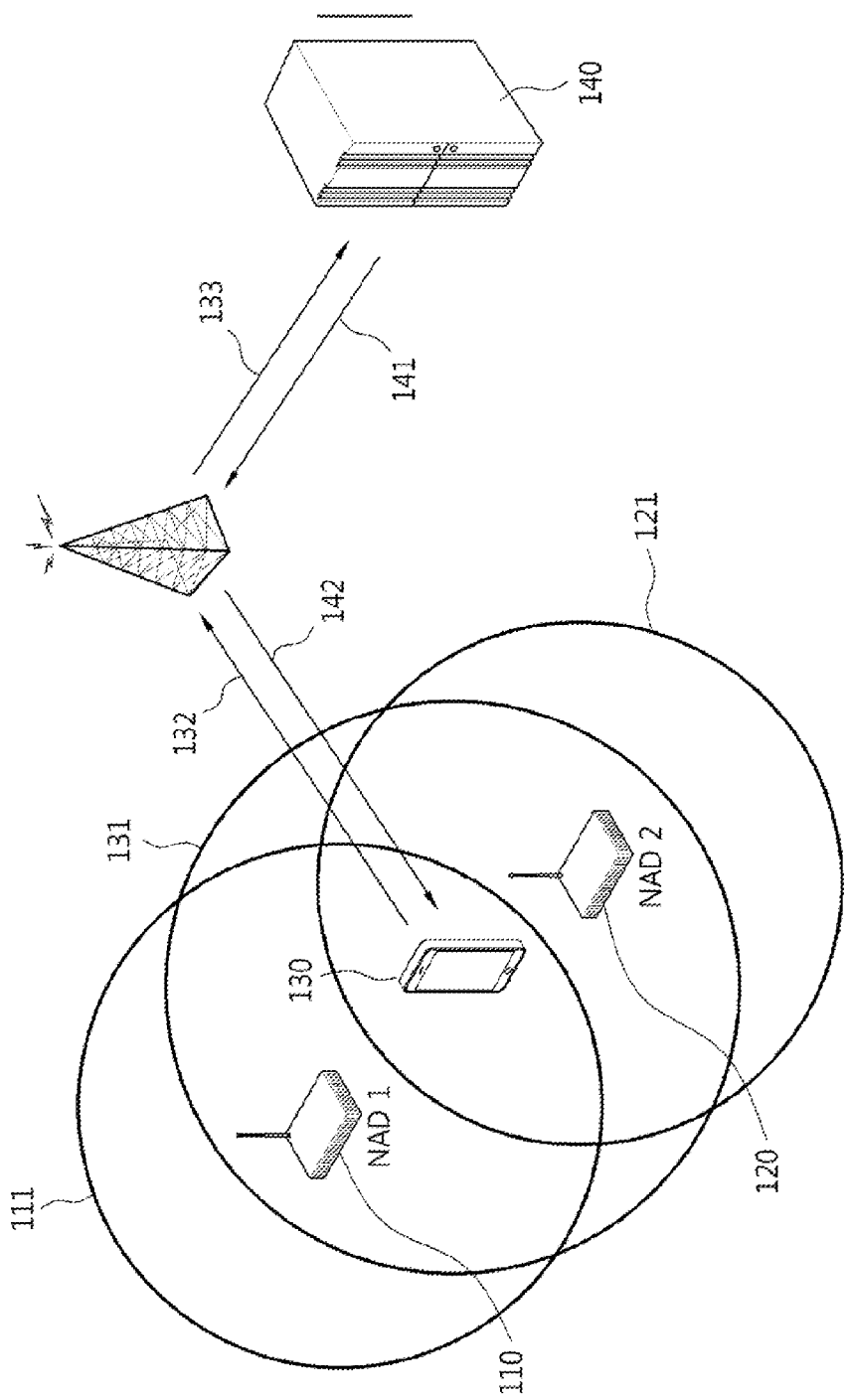
FIG. 1B is a diagram showing a system which provides contents mapped to a network access device, according to an exemplary embodiment of the inventive concept.

FIG. 1B is a diagram showing a system which provides contents mapped to a network access device, according to an exemplary embodiment of the inventive concept.

Referring to FIG. 1B, a system according to an exemplary embodiment of the inventive concept provides contents mapped to a network access device and contains at least one network access devices 110 and 120 and a contents providing server 140 linked with the at least one network access devices 110 and 120.

The system according to an exemplary embodiment of the inventive concept may use the at least one network access devices 110 and 120 as a source for providing contents (hereinafter referred to as "contents providing source"). In particular, the contents providing server 140 that the system includes maps contents to identification information of the at least one network access devices 110 and 120 and provides a user wireless device 130 with the contents mapped to the identification information of the at least one network access devices 110 and 120 placed in a smart space 131 of a user wireless device 130. Here, the smart space 131 may be a space where the user wireless device 130 searches for a network access device through wireless scanning and may vary with location information of the user wireless device 130. Also, the smart space 131 may mean a range which is predetermined according to GPS information of the user wireless device 130.

The contents providing server 140 maps contents to the identification information of the at least one network access devices 110 and 120. Upon receiving a request on mapping of contents to the identification information of the at least one network access devices 110 and 120, the contents providing server 140 may map the contents to the identification information of the at least one network access devices 110 and 120. Here, the at least one network access devices 110 and 120 may be at least one of a plurality of network access devices that the user wireless device 130 can access at a location where the user wireless device 130 sends the request on the mapping of the contents.

Also, upon receiving the request on the mapping of the contents, the contents providing server 140 may receive the request on the mapping of the contents to the identification information through a communication path that differs from that between the at least one network access devices 110 and 120 and the user wireless device 130. Also, the contents providing server 140 may receive the request on the mapping of the contents to the identification information using a separate communication protocol that differs from the communication protocol that the at least one network access devices 110 and 120 provide.

The contents providing server 140 also extracts identification information of at least one of the at least one network access devices 110 and 120 that the user wireless device 130 can access. In detail, the contents providing server 140 selects a network access device, which will map the contents, from among the at least one network access devices 110 and 120 according to the smart space 131 that is based on location information of the user wireless device 130 or at least on of mapping selection inputs received from the user wireless device 130. Since both the first network access device 110 and the second network access device 120 are placed in the smart space 131 as illustrated in FIG. 1B, the contents providing server 140 may select one of the first and second network access devices 110 and 120 as a network access device that will map the contents and may extract identification information of the selected network access device.

Upon selecting a network access device that will map the contents, the contents providing server 140 may consider communication coverages 111 and 121 of the at least one network access devices 110 and 120 as well as whether any one of the at least one network access devices 110 and 120 exists in the smart space 131 of the user wireless device 130. For example, the contents providing server 140 may select one, which will map the contents, from among the at least one network access devices 110 and 120, based on whether the user wireless device 130 is placed in a communication coverage of any network access device of the communication coverages 111 and 121 of the at least one network access devices 110 and 120. Since the user wireless device 130 is placed in both the communication coverage 111 of the first network access device 110 and the communication coverage 121 of the second network access device 120 as illustrated in FIG. 1B, the contents providing server 140 selects one of the first and second network access devices 110 and 120 as a network access device that will map the contents.

The contents providing server 140 receives an input on the contents through a user interface of the user wireless device 130 and maps and stores the input contents to the identification information of the selected network access device. This will be more fully described with reference to FIG. 3B. The contents providing server 140 not only maps the contents to the identification information of the selected network access device, but it also maps the contents to single identification information that is formed by combining the identification information of the selected network access device and identification information of a neighboring network access device, based on the identification information of the neighboring network access device adjacent to the selected network access device. This will be more fully described with reference to FIG. 4B.

After the above-described procedure is performed, the contents that is mapped to the identification information of the at least one network access devices 110 and 120 is provided to the user wireless device 130. The detailed procedure is as follows.

The contents providing server 140 receives a request on the contents mapped to the identification information of the at least one network access devices 110 and 120 from the user wireless device 130. Here, the at least one network access devices 110 and 120 may be at least one of a plurality of network access devices that the user wireless device 130 can access at a location where the user wireless device 130 sends the request on the mapped contents.

At this time, the contents providing server 140 receives the request on the contents mapped to the identification information of the at least one network access devices 110 and 120 from the user wireless device 130 through a communication path (132, 133) that differs from a communication path between the at least one network access devices 110 and 120 and the user wireless device 130. For example, in the event that the at least one network access devices 110 and 120 and the user wireless device 130 communicate with each other through a Wi-Fi communication path, the contents providing server 140 receives the request on the contents mapped to the identification information of the at least one network access devices 110 and 120 from the user wireless device 130 through a mobile communication network (132, 133). Also, the contents providing server 140 receives the request on the mapped contents using a separate communication protocol that differs from the communication protocol that the at least one network access devices 110 and 120 provide.

At this time, that the contents providing server 140 receives the request on the contents mapped to the identification information of the at least one network access devices 110 and 120 from the user wireless device 130 may mean the selecting of the at least one network access devices 110 and 120 according to the smart space 131 that is based on location information of the user wireless device 130 or at least one of device selection inputs received from the user wireless device 130. Thus, the contents providing server 140 selects the at least one network access devices 110 and 120 according to the smart space 131 that is based on location information of the user wireless device 130. Since both the first network access device 110 and the second network access device 120 are placed in the smart space 131 as illustrated in FIG. 1B, the contents providing server 140 may select one of the first network access device 110 and the second network access device 120.

Upon receiving the request on the contents, the contents providing server 140 searches for contents mapped to the identification information of the at least one network access devices 110 and 120, based on the identification information of the at least one network access devices 110 and 120. For example, upon receiving a request on contents mapped to the identification information of the first network access device 110, the contents providing server 140 searches for contents mapped to the identification information of the first network access device 110.

At this time, the contents providing server 140 further searches for contents mapped to a neighboring network access device adjacent to the least one network access devices 110 and 120 in addition to contents mapped to the least one network access devices 110 and 120 and provides the found result to the user wireless device 130. This will be more fully described with reference to FIG. 2B.

Afterwards, the contents providing server 140 provides the found contents to the user wireless device 130 through a communication path (141, 142) that differs from the communication path between the at least one network access devices 110 and 120 and the user wireless device 130. For example, in the event that the at least one network access devices 110 and 120 and the user wireless device 130 communicate with each other through the Wi-Fi communication path, the contents providing server 140 provides the found contents to the user wireless device 130 through a mobile communication network (141, 142). Also, the contents providing server 140 provides the found contents to the user wireless device 130 using a separate communication protocol that differs from the communication protocol that the at least one network access devices 110 and 120 provide.

Figure 2A:
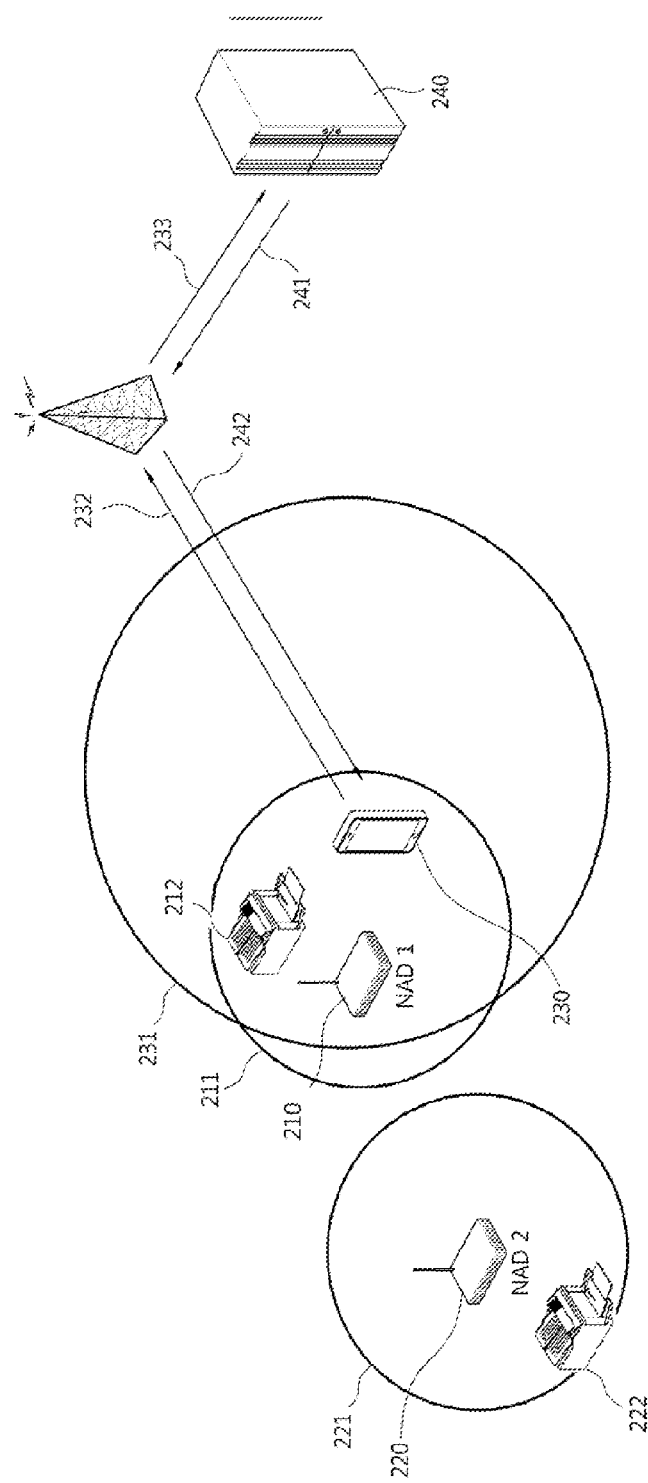
FIG. 2A is a diagram showing a system which provides a smart print service of a smart printer mapped to a network access device not placed in a smart space of a user wireless device, according to an exemplary embodiment of the inventive concept.

FIG. 2A is a diagram showing a system which provides a smart print service of a smart printer mapped to a network access device not placed in a smart space of a user wireless device, according to an exemplary embodiment of the inventive concept.

Referring to FIG. 2A, a system according to an exemplary embodiment of the inventive concept contains at least one network access device 210, a global mapping server 240, a user wireless device 130, and at least one smart printer 222. Here, a first network access device 210 adjacent to a first smart printer 212 is only placed in a smart space 231 of the user wireless device 230, and a second network access device 220 adjacent to a second smart printer 222 gets out of the smart space 231.

The global mapping server 240 not only provides the user wireless device 230 with smart printer information mapped to the at least one network access device 210 placed in the smart space 231 of the user wireless device 230, but it provides the user wireless device 230 with smart printer information mapped to a neighboring network access device 220 that is adjacent to the at least one network access device 210 and gets out of the smart space 231. For example, when receiving a request on smart printer information mapped to identification information of the at least one network access device 210 from the user wireless device 230 (232, 233), the global mapping server 240 extracts identification information of the neighboring network access device 220 adjacent to the at least one network access device 210, based on the identification information of the at least one network access device 210. Next, the global mapping server 240 searches for smart printer information mapped to the identification information of the at least one network access device 210 and smart printer information mapped to the identification information of the neighboring network access device 220 and provides the user wireless device 240 with the found smart printer information through a communication path (241, 242) that differs from a communication path between the at least one network access device 210 and the user wireless device 230. Thus, the user wireless device 230 uses smart printer information mapped to a network access device far from the user wireless device 230 in distance as well as smart printer information mapped to a network access device adjacent to the user wireless device 230 in distance based on the smart space 231.

In detail, the global mapping server 240 selects the first network access device 210 according to the smart space 231 that is based on location information of the user wireless device 230. A manner in which the first network access device 210 is selected according to the smart space 231 may be replaced with a manner in which there is selected the first network access device 210 having a communication coverage 211, including the user wireless device 230, from among communication coverages 211 and 221.

Afterwards, the global mapping server 240 extracts identification information of the second network access device 220 adjacent to the first network access device 210 based on the identification information of the first network access device 210. The global mapping server 240 searches for smart printer information mapped to the identification information of the second network access device 220 and smart printer information mapped to the identification information of the first network access device 210 and provides the found smart printer information to the user wireless device 230 (241, 242).

Thus, the user wireless device 230 uses the first smart printer 212 adjacent to the user wireless device 230 in distance and the second smart printer 222 far from the user wireless device 230 in distance.

Figure 2B:
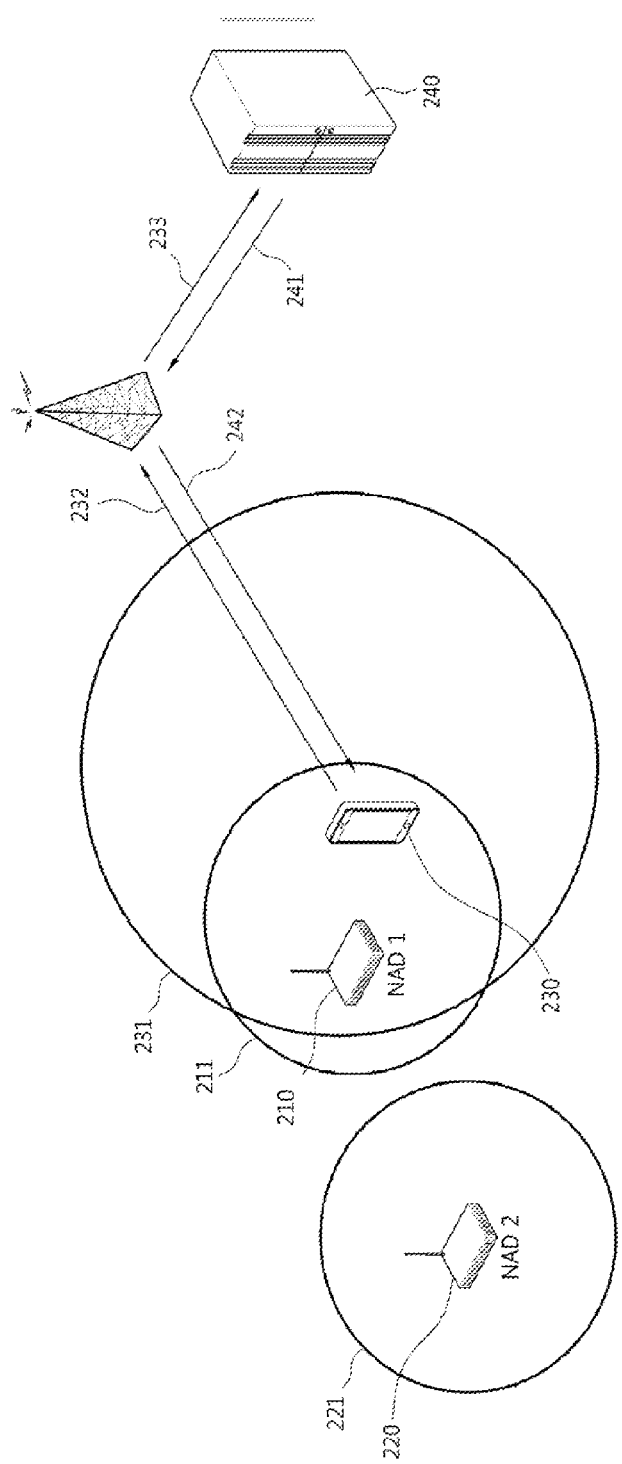
FIG. 2B is a diagram showing a system which provides contents mapped to a network access device not placed in a smart space of a user wireless device, according to an exemplary embodiment of the inventive concept.

FIG. 2B is a diagram showing a system which provides contents mapped to a network access device not placed in a smart space of a user wireless device, according to an exemplary embodiment of the inventive concept.

Referring to FIG. 2B, a system according to an exemplary embodiment of the inventive concept contains at least one network access device 210 and a contents providing server 240. Here, a first network access device 210 is only placed in a smart space 231 of a user wireless device 230, and a second network access device 220 gets out of the smart space 231.

The contents providing server 240 not only provides the user wireless device 230 with contents mapped to the at least one network access device 210 placed in the smart space 231 of the user wireless device 230, but it provides the user wireless device 230 with contents mapped to a neighboring network access device 220 adjacent to the at least one network access device 210. At this time, the contents providing server 240 provides the user wireless device 230 with contents mapped to the neighboring network access device 220 regardless of whether the neighboring network access device 220 is placed in or gets out of the smart space 231. For example, when receiving a request on contents mapped to identification information of the at least one network access device 210 from the user wireless device 230 (232, 233), the contents providing server 240 extracts identification information of the neighboring network access device 220 adjacent to the at least one network access device 210, based on the identification information of the at least one network access device 210. Next, the contents providing server 240 searches for contents mapped to the identification information of the at least one network access device 210 and contents mapped to the identification information of the neighboring network access device 220 and provides the user wireless device 230 with the found smart printer information through a communication path (241, 242) that differs from a communication path between the at least one network access device 210 and the user wireless device 230.

In detail, the contents providing server 240 selects the first network access device 210 according to the smart space 231 that is based on location information of the user wireless device 230. A manner in which the first network access device 210 is selected according to the smart space 231 may be replaced with a manner in which there is selected the first network access device 210 having a communication coverage 211, including the user wireless device 230, from among communication coverages 211 and 221.

Afterwards, the contents providing server 240 extracts identification information of the second network access device 220 adjacent to the first network access device 210 based on the identification information of the first network access device 210. The contents providing server 240 searches for contents mapped to the identification information of the second network access device 220 and contents mapped to the identification information of the first network access device 210 and provides the found contents to the user wireless device 230 (241, 242).

Figure 3A:
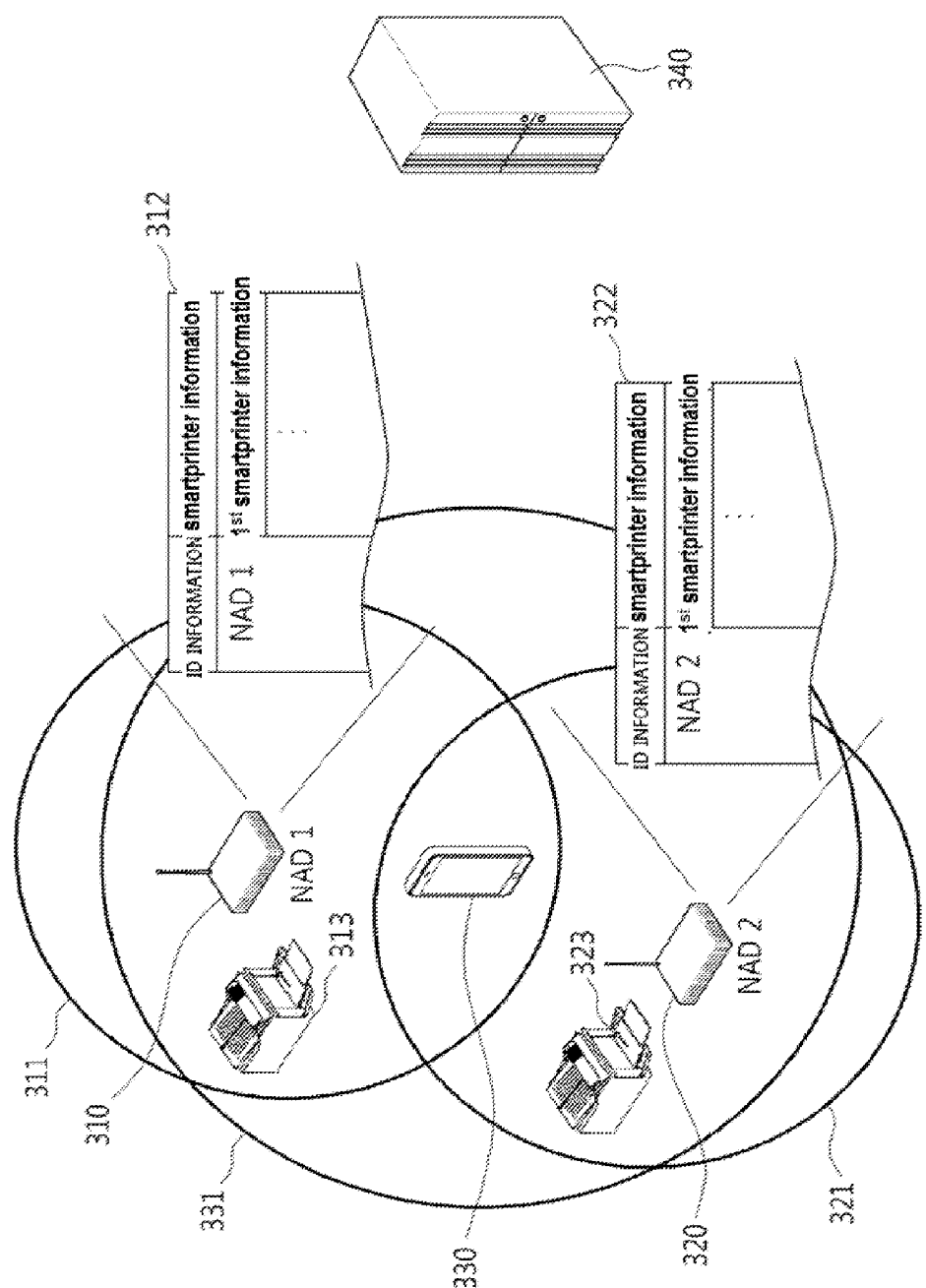
FIG. 3A is a diagram showing smart printers which are respectively mapped to pieces of identification information of different network access devices, according to an exemplary embodiment of the inventive concept.

FIG. 3A is a diagram showing smart printers which are respectively mapped to pieces of identification information of different network access devices, according to an exemplary embodiment of the inventive concept.

Referring to FIG. 3A, a global mapping server 340 according to an exemplary embodiment of the inventive concept provides a user wireless device 330 with pieces of smart printer information 312 and 322 mapped to identification information of at least one network access devices 310 and 320 by mapping the pieces of smart printer information 312 and 322 to pieces of identification information of the at least one network access devices 310 and 320. Here, the at least one network access devices 310 and 320 may be used as a smart printer providing server, not the communication means.

At this time, the pieces of smart printer information 312 and 322 mapped to the at least one network access devices 310 and 320 may include IP information of at least one smart printers 313 and 323 as essential information for using the at least one smart printers 313 and 323. The smart printer information 312 and 322 may further include an ID and a password for authorizing a restrictive permission. Also, the smart printer information 312 and 322 may include an IP address of a printer server in which the IP information of the at least one smart printers 313 and 322 is stored, without including the IP information of the at least one smart printers 313 and 322. At this time, the printer server in which the IP information of the at least one smart printers 313 and 322 is stored may be included in the global mapping server 340, may be implemented as a separate printer server, or may be disposed in the at least one smart printers 313 and 322. Thus, the global mapping server 340 may load the smart printer information 312 and 322 from the printer server to map it to identification information of the at least one network access devices 310 and 320, without receiving the smart printer information 312 and 322 through a user interface of a user wireless device 330.

For example, the first smart printer information 312 that is mapped to the identification information of the first network access device 310 is stored at the global mapping server 340 or at a separate printer server included in the first network access device 310 to use the first smart printer 313 adjacent to the first network access device 310 in distance. Thus, in the event that the first network access device 310 is placed in a smart space 331 of the user wireless device 330, the first smart printer information 312 thus mapped is provided to the user wireless device 330 through a communication path that differs from a communication path between the first network access device 310 and the user wireless device 330. At this time, if the smart space 311 is not used and the user wireless device 330 is determined as being placed in a communication coverage 311 of the first network access device 310, the first smart printer information 312 thus mapped may be provided to the user wireless device 330.

Also, the second smart printer information 322 that is mapped to the identification information of the second network access device 320 is stored at the global mapping server 340 or at a separate printer server included in the second network access device 320 to use the second smart printer 323 adjacent to the second network access device 320 in distance. Thus, in the event that the second network access device 320 is placed in the smart space 331 of the user wireless device 330, the second smart printer information 322 thus mapped is provided to the user wireless device 330 through a communication path that differs from a communication path between the second network access device 320 and the user wireless device 330. At this time, if the smart space 311 is not used and the user wireless device 330 is determined as being placed in a communication coverage 321 of the second network access device 320, the second smart printer information 322 thus mapped may be provided to the user wireless device 330.

Figure 3B:
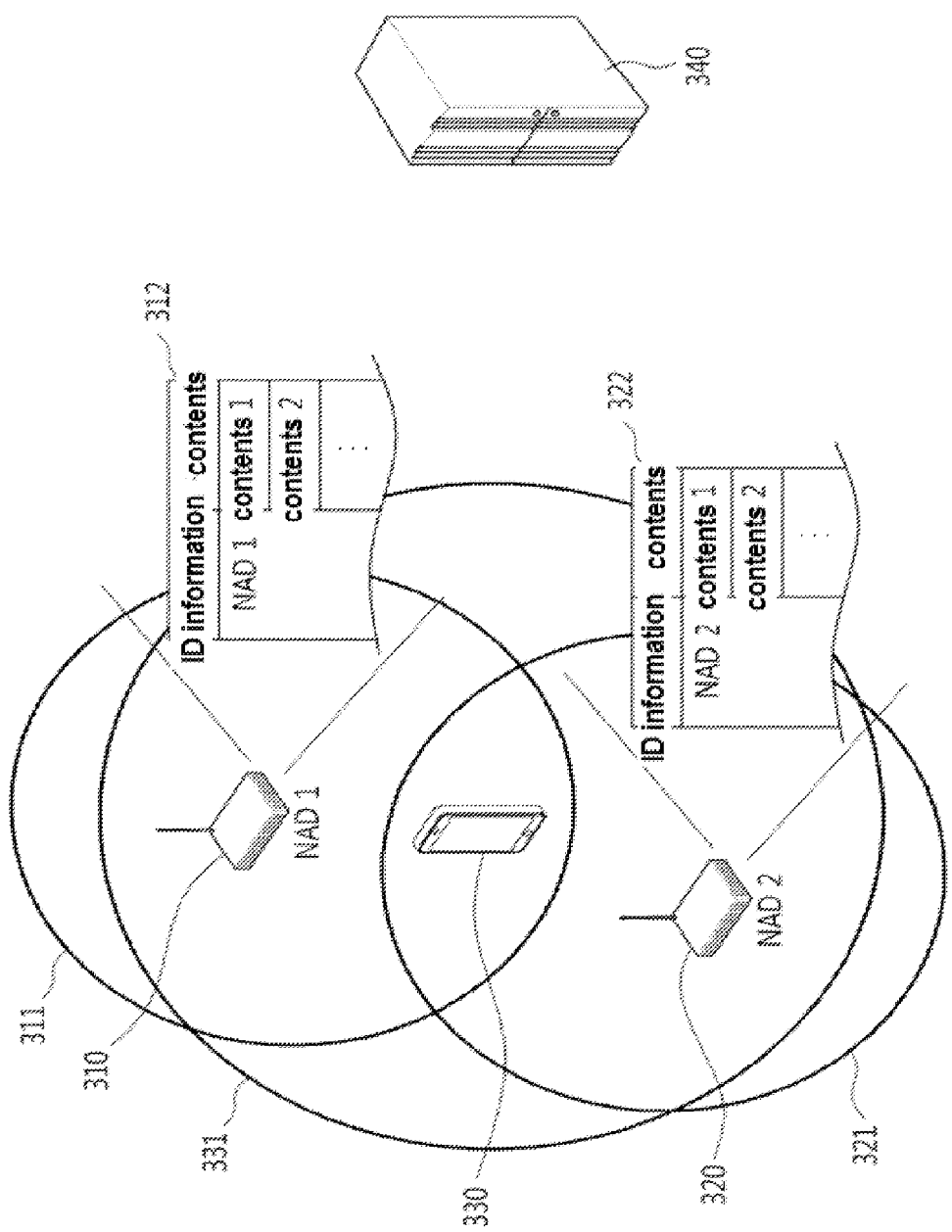
FIG. 3B is a diagram showing contents which are respectively mapped to pieces of identification information of different network access devices, according to an exemplary embodiment of the inventive concept.

FIG. 3B is a diagram showing contents which are respectively mapped to pieces of identification information of different network access devices, according to an exemplary embodiment of the inventive concept.

Referring to FIG. 3B, a contents providing server 340 according to an exemplary embodiment of the inventive concept provides a user wireless device 330 with contents mapped to identification information of at least one network access devices 310 and 320 by mapping the contents to the identification information of the at least one network access devices 310 and 320. Here, the at least one network access devices 310 and 320 may be used as a contents providing server, not the communication means.

For example, the contents 312 that is mapped to the identification information of the first network access device 310 is stored at the global mapping server 340 or at a separate database server included in the first network access device 310. Thus, in the event that the first network access device 310 is placed in a smart space 331 of the user wireless device 330, the mapped contents is provided to the user wireless device 330 through a communication path that differs from a communication path between the first network access device 310 and the user wireless device 330. At this time, if the smart space 311 is not used and the user wireless device 330 is determined as being placed in communication coverage 311 of the first network access device 310, the mapped contents 312 may be provided to the user wireless device 330.

Also, the contents 322 that are mapped to the identification information of the second network access device 320 are stored at the global mapping server 340 or at a separate database server included in the second network access device 320. Thus, in the event that the second network access device 320 is placed in the smart space 331 of the user wireless device 330, the mapped contents 322 is provided to the user wireless device 330 through a communication path that differs from a communication path between the second network access device 320 and the user wireless device 330. At this time, if the user wireless device 330 is determined as being placed in communication coverage 321 of the second network access device 320, the mapped contents 322 may be provided to the user wireless device 330 without using the smart space 311.

Figure 4A:
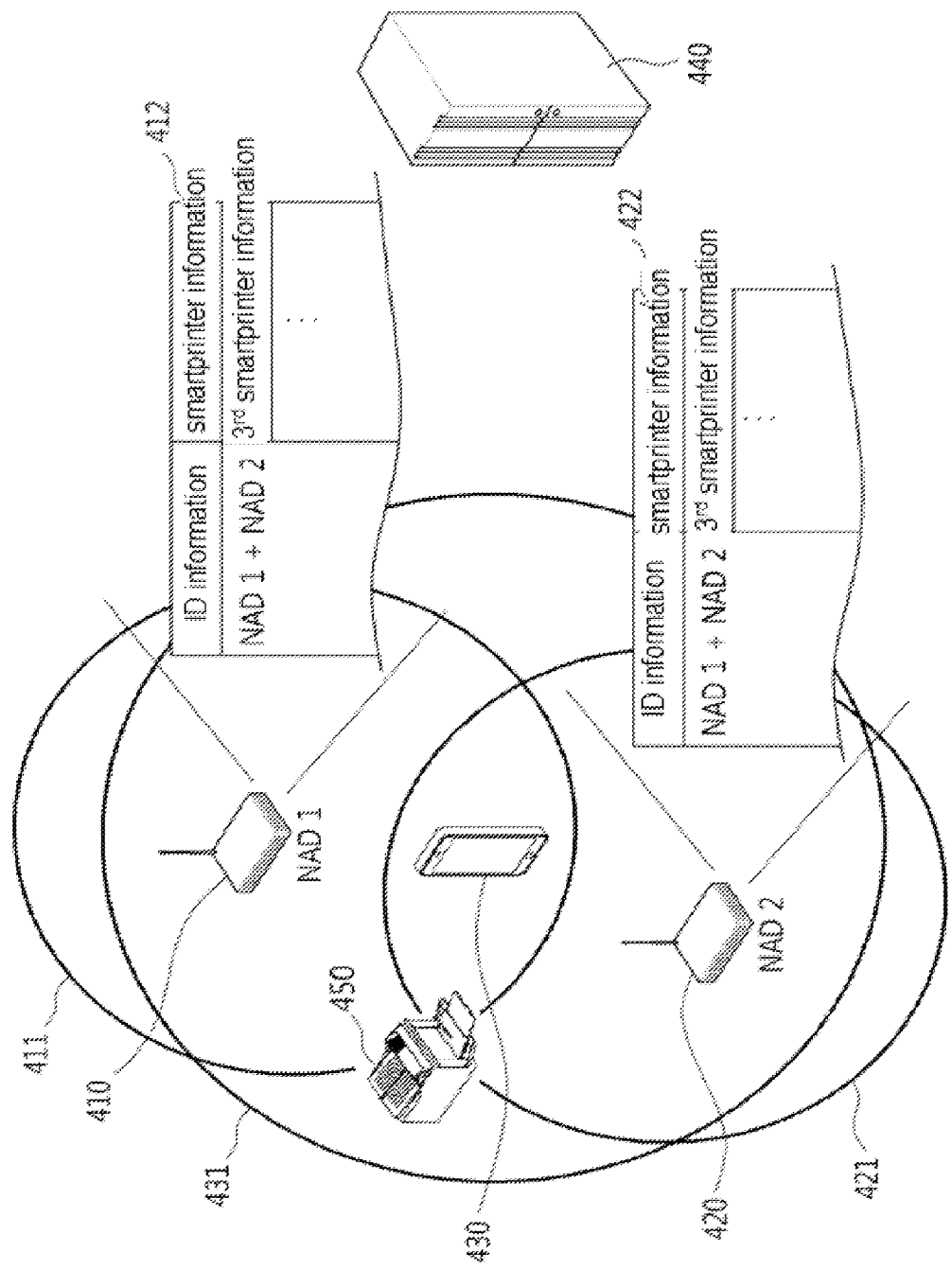
FIG. 4A is a diagram showing a smart printer which is mapped to single identification information obtained by combing pieces of identification information of different network access devices, according to an exemplary embodiment of the inventive concept.

FIG. 4A is a diagram showing a smart printer which is mapped to single identification information obtained by combing pieces of identification information of different network access devices, according to an exemplary embodiment of the inventive concept.

Referring to FIG. 4A, a global mapping server 440 according to an exemplary embodiment of the inventive concept maps pieces of smart printer information 412 and 422 on one smart printer 450 to single identification information, obtained by combining identification information of a first network access device 410 and identification information of a second network access device 420, when only one smart printer 450 is disposed in a space where at least one network access devices 410 and 420 exist. Thus, the global mapping server 440 provides a user wireless device 430 with the mapped smart printer information 412 and 422 when the first network access device 410 and the second network access device 420 are all placed in a smart space 431 of the user wireless device 430. Also, in the event that one of the first network access device 410 and the second network access device 420 exists in the smart space 431 of the user wireless device 430, the global mapping server 440 further searches for the smart printer information 412 and 422 mapped to a neighboring network access device as described with reference to FIG. 2B, thereby making it possible to provide the user wireless device 430 with the smart printer information 412 and 422 mapped to the single identification information.

The global mapping server 440 generates single identification information by combining identification information of a first network access device 410 and identification information of a second network access device 420 and maps the smart printer information 412 and 422 to the generated single identification information. For example, the global mapping server 440 receives a request on mapping of the smart printer information 412 and 422 from the user wireless device 430, selects the first network access device 410, placed in the smart space 431, from among the at least one network access devices 410 and 420, and extracts identification information of the first network access device 410. Here, the first network access device 410 is selected when the smart space 431 is not used and the user wireless device 430 is determined as being placed in communication coverage 411 of the first network access device 410.

Upon extracting identification information of the first network access device 410, the global mapping server 440 further extracts identification information of the second network access device 420 that is placed in the smart space 431 and is adjacent to the first network access device 410. Also, the identification information of the second network access device 420 is further extracted when the smart space 431 is not used and the user wireless device 430 is determined as being placed in communication coverage 421 of the second network access device 420.

Afterwards, the global mapping server 440 receives an input on the smart printer information 412 and 422 through a user interface of the user wireless device 430 and generates single identification information corresponding to the first network access device 410 by combining identification information of the first network access device 410 and identification information of the second network access device 420, thereby making it possible to map the smart printer information 412 and 422 to the generated single identification information. At this time, the smart printer information 412 and 422 mapped to the single identification information may be stored at a printer server included in each of the first and second network access devices 410 and 420 or at the global mapping server 440.

Also, the smart printer information 412 and 422 mapped to the single identification information is provided to the user wireless device 430. For example, when receiving a request on the smart printer information 412 mapped to identification information of the first network access device 410 of the at least one network access devices 410 and 420 from the user wireless device 430 and searching for the smart printer information 412 mapped to the first network access device 410 in response to the received request, the global mapping server 440 recognizes that the smart printer 412 is mapped to the single identification information generated by combining identification information of the first network access device 410 and identification information of the second network access device 420. In this case, the global mapping server 440 extracts identification information of the first network access device 410 and identification information of the second network access device 420 and combines the extracted identification information to obtain the single identification information. Thus, the global mapping server 440 searches for the smart printer information 412 and 422 mapped to the obtained single identification information.

Figure 4B:
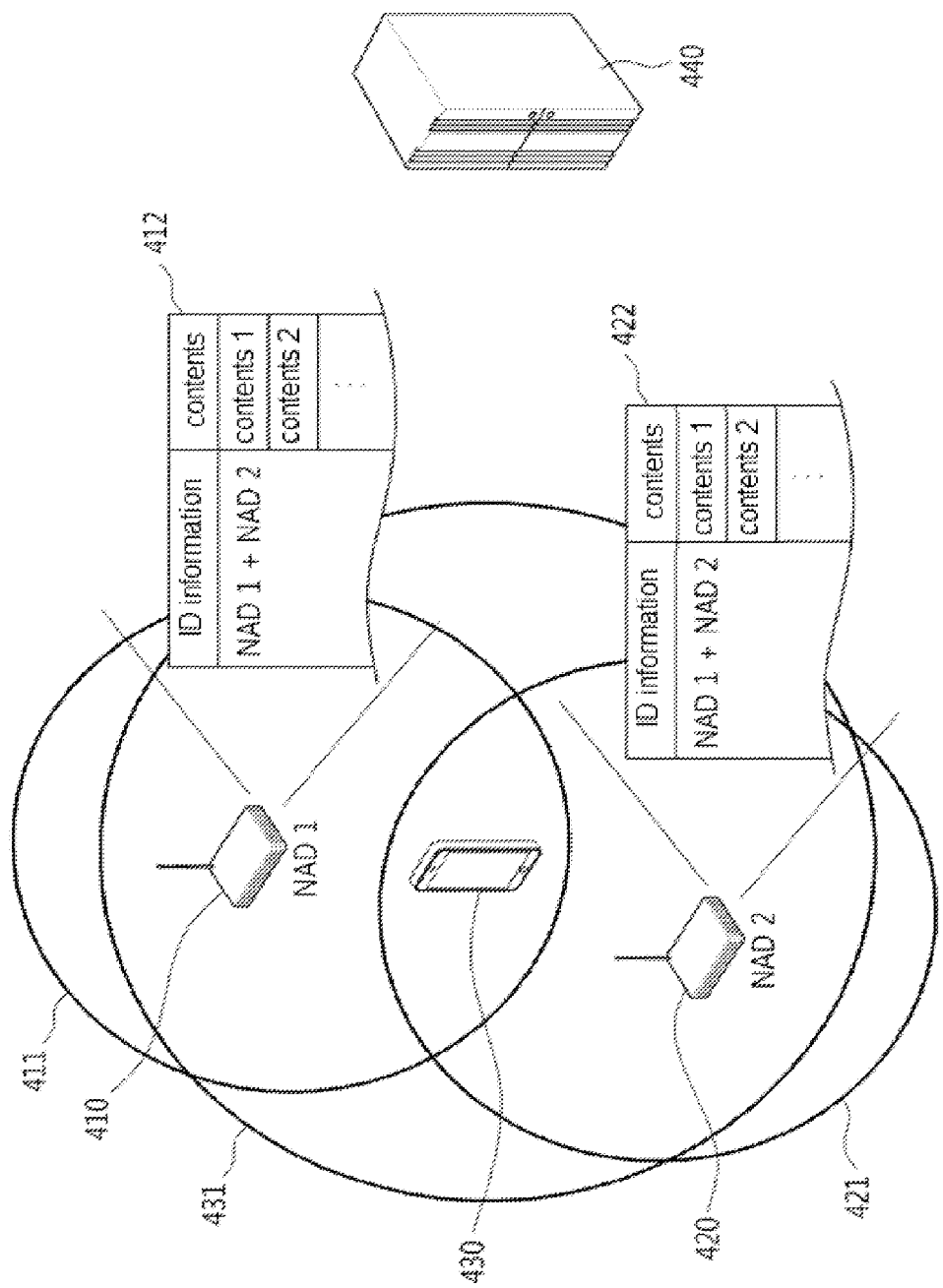
FIG. 4B is a diagram showing contents which are mapped to single identification information obtained by combing pieces of identification information of different network access devices, according to an exemplary embodiment of the inventive concept.

FIG. 4B is a diagram showing contents which are mapped to single identification information obtained by combing pieces of identification information of different network access devices, according to an exemplary embodiment of the inventive concept.

Referring to FIG. 4B, a contents providing server 440 according to an exemplary embodiment of the inventive concept maps contents on single identification information, obtained by combining identification information of a first network access device 410 and identification information of a second network access device 420. Thus, when only the first and second network access devices 410 and 420 are all placed in a smart space 431 of a user wireless device 430, the contents providing server 440 provides the mapped contents to the user wireless device 430.

The contents providing server 440 generates single identification information by combining identification information of the first network access device 410 and identification information of the second network access device 420 and maps the contents to the generated single identification information. For example, the contents providing server 440 receives a request on mapping of the contents from the user wireless device 430, selects the first network access device 410, placed in the smart space 431 of the user wireless device 430, from among the at least one network access devices 410 and 420, and extracts identification information of the first network access device 410. Here, the first network access device 410 is selected when the smart space 431 is not used and the user wireless device 430 is determined as being placed in communication coverage 411 of the first network access device 410.

Upon extracting identification information of the first network access device 410, the contents providing server 440 further extracts identification information of the second network access device 420 that is placed in the smart space 431 and is adjacent to the first network access device 410. Also, the identification information of the second network access device 420 is further extracted when the smart space 431 is not used and the user wireless device 430 is determined as being placed in communication coverage 421 of the second network access device 420.

Afterwards, the contents providing server 440 receives an input on the contents through a user interface of the user wireless device 430 and generates single identification information corresponding to the first network access device 410 by combining identification information of the first network access device 410 and identification information of the second network access device 420, thereby making it possible to map the contents 412 and 422 to the generated single identification information. At this time, the contents 412 and 422 mapped to the single identification information may be stored at a database served included in each of the first and second network access devices 410 and 420 or at the contents providing server 440.

Also, the contents 412 and 422 mapped to the single identification information are provided to the user wireless device 430. For example, when receiving a request on the contents mapped to identification information of the first network access device 410 of the at least one network access devices 410 and 420 from the user wireless device 430 and searching for the contents mapped to the first network access device 410 in response to the received request, the contents providing server 440 recognizes that the contents is mapped to the single identification information generated by combining identification information of the first network access device 410 and identification information of the second network access device 420. In this case, the contents providing server 440 extracts identification information of the first network access device 410 and identification information of the second network access device 420, and it combines the extracted identification information to obtain the single identification information. Thus, the contents providing server 440 searches for the contents 412 and 422 mapped to the obtained single identification information.

Figure 5A:
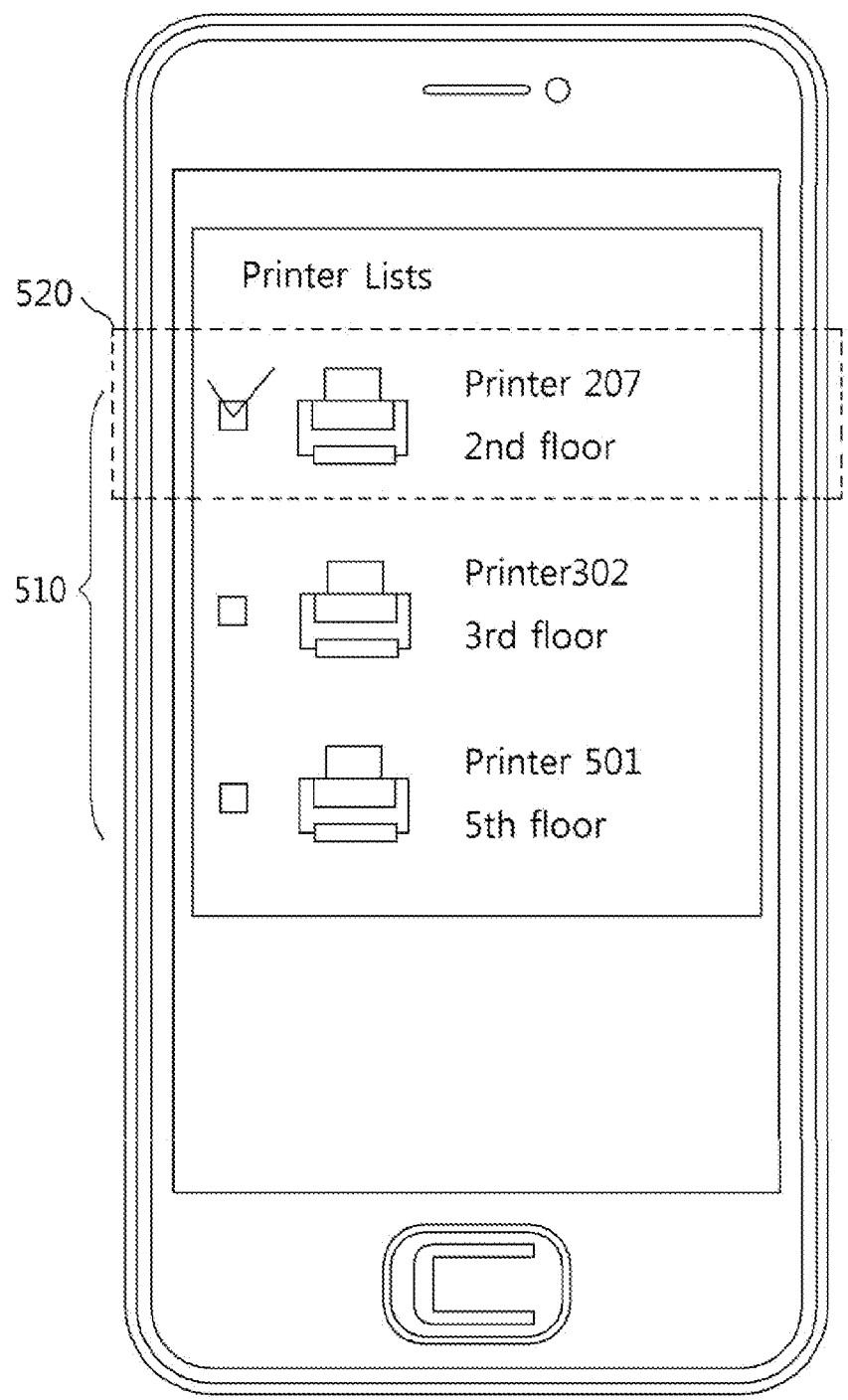
FIG. 5A is a diagram showing a user interface for providing a smart print service of a smart printer mapped to a network access device, according to an exemplary embodiment of the inventive concept.

FIG. 5A is a diagram showing a user interface for providing a smart print service of a smart printer mapped to a network access device, according to an exemplary embodiment of the inventive concept.

Referring to FIG. 5A, a user interface according to an exemplary embodiment of the inventive concept includes pieces of smart printer information 510 mapped to identification information of at least one network access devices. For example, smart printer information 520 mapped to a first network access device is displayed on the user interface.

Here, the displayed smart printer information 510 may include IP addresses, names, and location information of smart printers.

A user wireless device may use a first smart printer corresponding to the smart printer information 520, based on the smart printer information 520, selected through the user interface, from among the pieces of smart printer information 520.

Figure 5B:
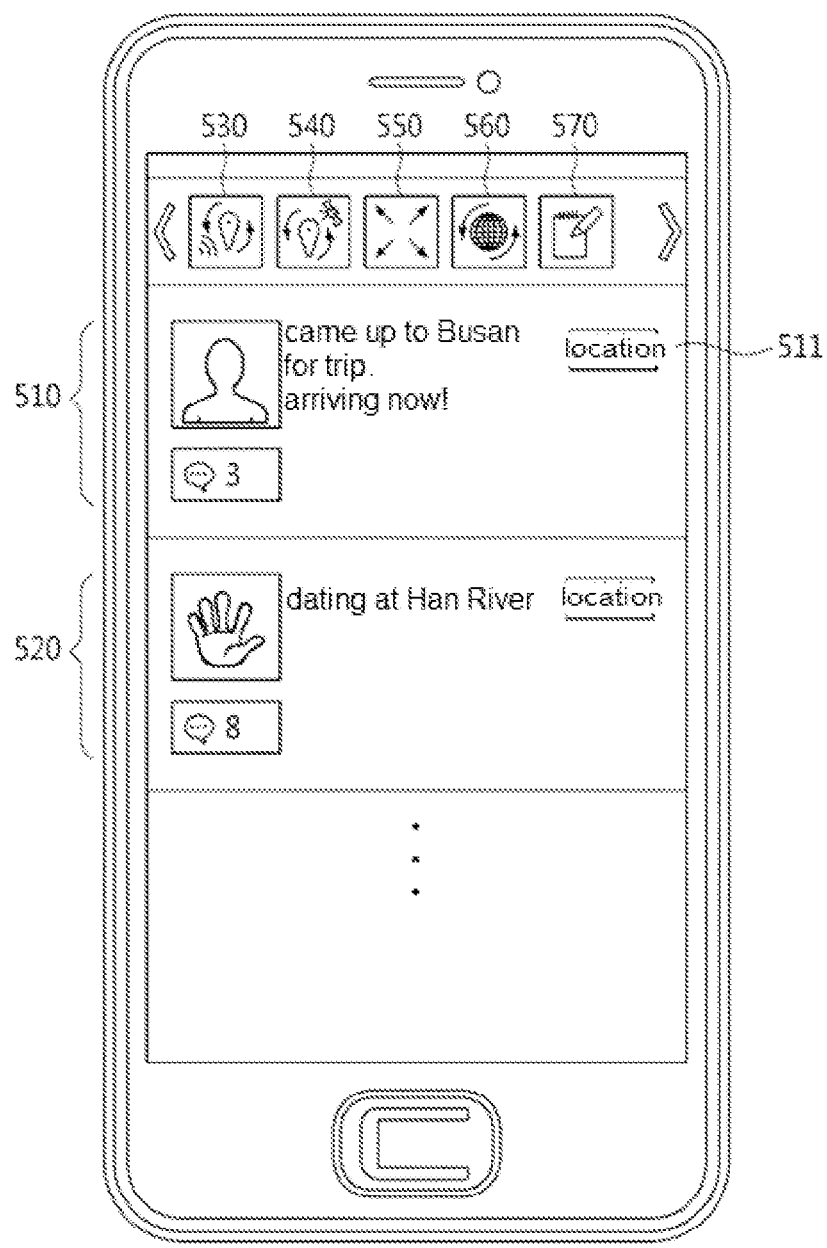
FIG. 5B is a diagram showing a user interface for providing contents mapped to a network access device, according to an exemplary embodiment of the inventive concept.

FIG. 5B is a diagram showing a user interface for providing contents mapped to a network access device, according to an exemplary embodiment of the inventive concept.

Referring to FIG. 5B, contents mapped to identification information of at least one network access device are provided on a user interface according to an exemplary embodiment of the inventive concept. For example, contents 510 mapped to a first network access device and contents 520 mapped to a second network access device are displayed on the user interface.

Here, a first icon 530, a second icon 540, a third icon 550, a fourth icon 560, and a fifth icon 560 are disposed at the top of the user interface to filter contents to be displayed. The first icon 530 is an icon for searching for a network access device to which contents to be displayed are mapped. For example, when a selection input on the first icon 530 is received, a smart space of a user wireless device as a space for searching for a network access device to which contents are mapped is set to a predetermined range where the user wireless device scans in a wireless manner. Also, when a selection input on the second icon 540 is received, the smart space of the user wireless device is set to a range that is predetermined based on GPS information of the user wireless device.

When a selection input on the third icon 550 is received, the smart space that is set in response to receiving the selection input on the first icon 530 or the selection input on the second icon 540 increases according to the constant magnification. In detail, when a selection input on the third icon 550 is received, the smart space (a predetermined range for wireless scanning) that is set in response to receiving the selection input on the first icon 530 increases according to the constant magnification.

Also, when a selection input on the fourth icon 560 is received, contents mapped to pieces of identification information of all network access devices are displayed regardless of the smart space.

When a selection input on the fifth icon 570 is received, a network access device, which will map contents, from among at least one network access devices is selected, and an input window for receiving contents to be mapped to the selected network access device is displayed.

In particular, when a selection input on a specific button 511 of specific contents 510 of displayed contents is received through the user interface according to an exemplary embodiment of the inventive concept, other contents corresponding to a specific network access device to which the specific contents 510 are mapped are additionally displayed. Here, the other contents corresponding to the specific network access device may mean other contents mapped to the specific network access device. This will be more fully described with reference to FIG. 5C.

Figure 5C:
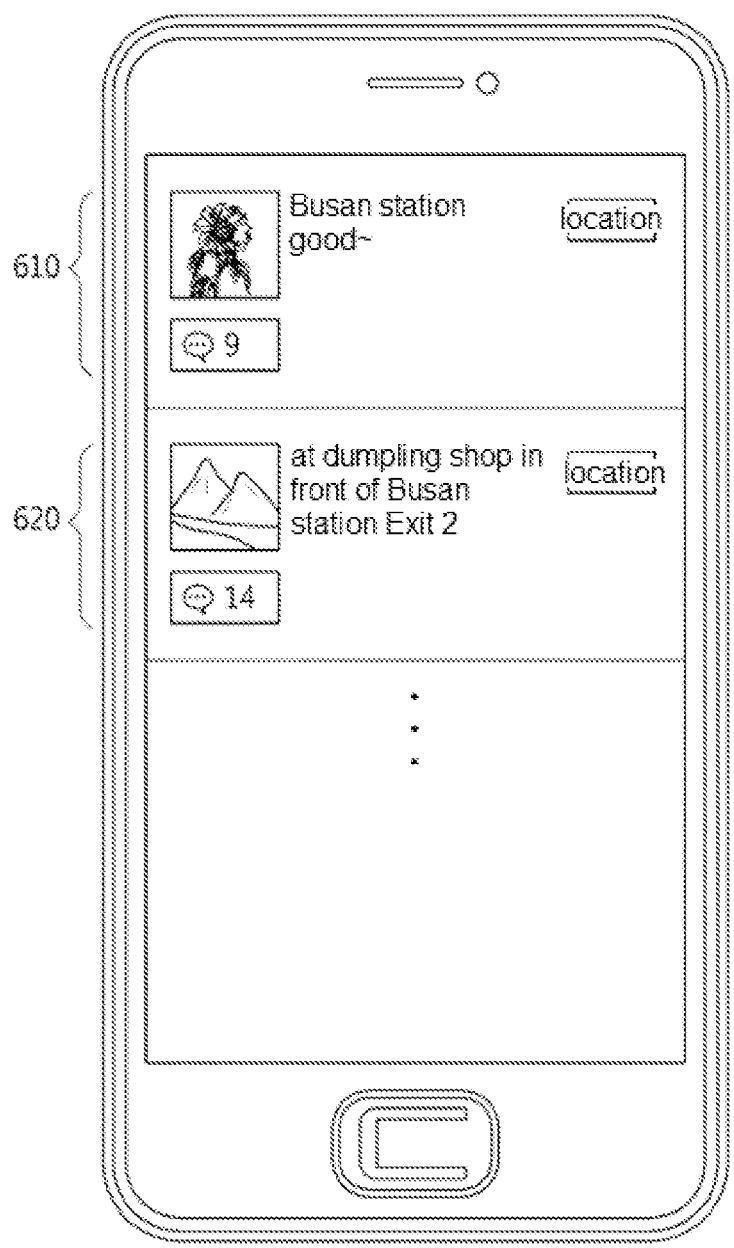
FIG. 5C is a diagram showing a user interface where other contents mapped to a network access device corresponding to displayed contents are provided, according to an exemplary embodiment of the inventive concept.

FIG. 5C is a diagram showing a user interface where other contents mapped to a network access device corresponding to displayed contents are provided, according to an exemplary embodiment of the inventive concept.

Referring to FIG. 5C, when a selection input on specific contents of displayed contents is received through the user interface according to an exemplary embodiment of the inventive concept, identification information of a specific network access device, to which specific contents are mapped, from among at least one network access devices are extracted, and the searching of other contents that are mapped to the identification information of the specific network access device and are distinguishable from the specific contents is made. Afterwards, the found other contents may be provided to a user wireless device.

In the event that a selection input on displayed specific contents is received under a condition where the specific contents are mapped to a specific network access device placed at the Busan station, identification information of the specific network access device to which the specific contents are mapped and which is placed at the Busan station is extracted and the searching of other contents 610 and 620 mapped to the identification information of the specific network access device and distinguishable from the specific contents is made. The found result may be displayed through the user interface.

Figure 6:
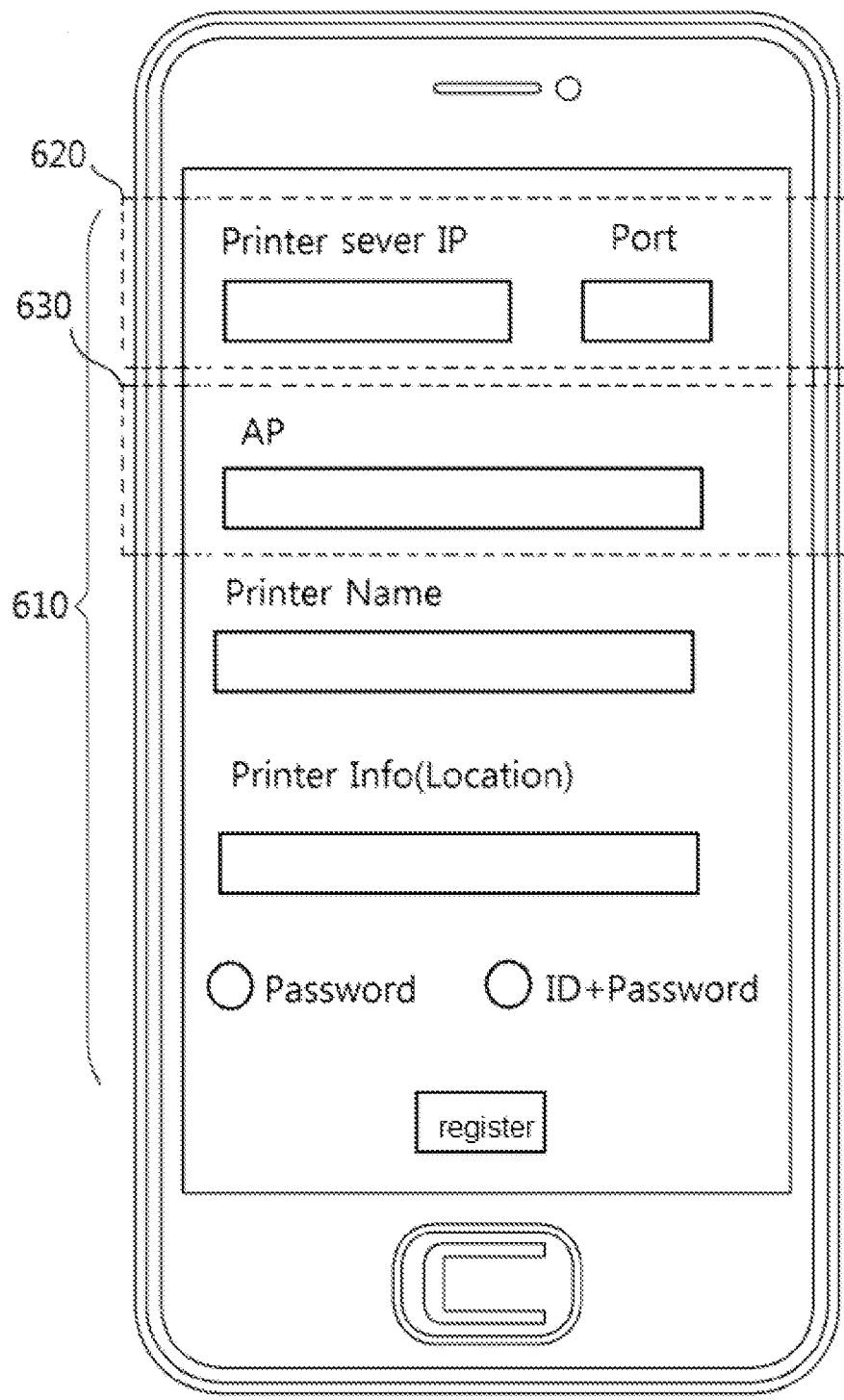
FIG. 6 is a diagram showing a user interface which receives smart printer information to map a smart printer to a network access device, according to an exemplary embodiment of the inventive concept.

FIG. 6 is a diagram showing a user interface which receives smart printer information to map a smart printer to a network access device, according to an exemplary embodiment of the inventive concept.

Referring to FIG. 6, an input window 610 for receiving a selection input on smart printer information corresponding to a smart printer is displayed on a user interface according to an exemplary embodiment of the inventive concept to map smart printer information to identification information of a network access device.

For example, there is displayed the input window 610 for mapping a first smart printer to a first network access device. In detail, there are displayed a window 620 for inputting IP information on the first smart printer and a window for inputting identification information of the first network access device. At this time, the IP information on the first smart printer may be replaced with IP information of a printer server that stores the IP information on the first smart printer and then may be input. Also, the IP information on the first smart printer may be automatically loaded from the printer server that stores the IP information on the first smart printer and then may be input. The IP information on the first smart printer or the IP information of the printer server may be acquired through a wireless device that differs from a user wireless device.

Also, the identification information of the first network access device is not input through a user interface, but it is automatically input by searching for identification information of a network access device placed in a smart space that is based on location information of the user wireless device.

Also, a password for a restrictive permission of a smart printer corresponding to smart printer information or a combination of an ID and a password is additionally input through the input window 610 for inputting the smart printer information.

Figure 7A:
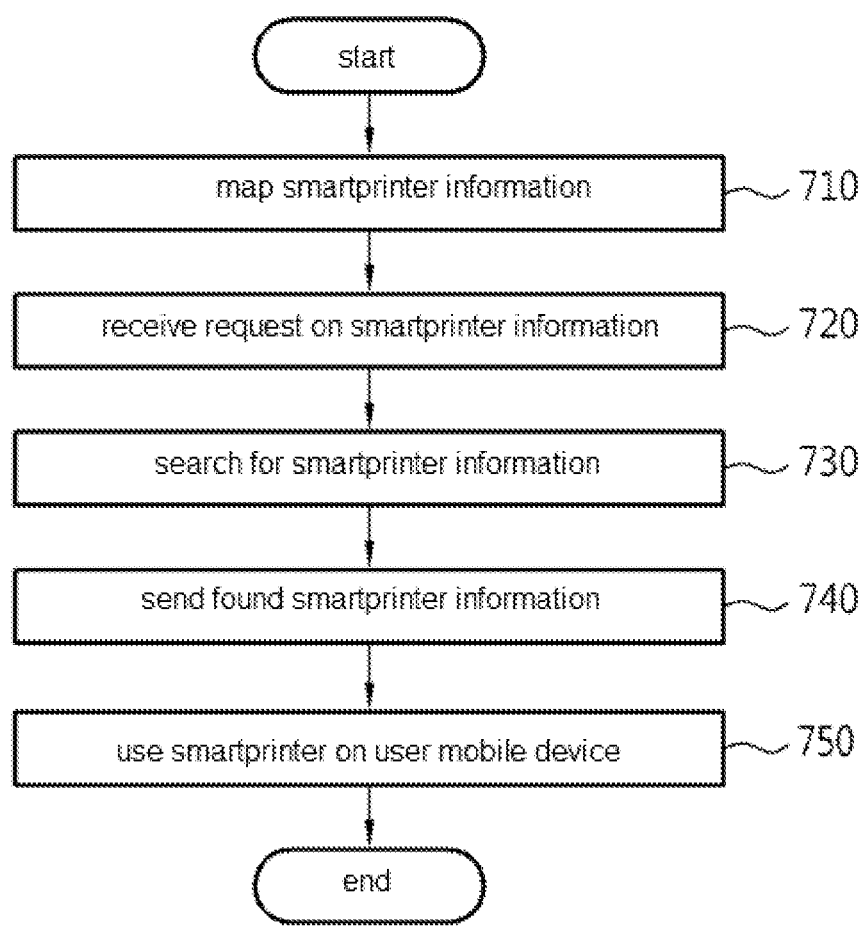
FIG. 7A is a flow chart showing a method for providing a smart print service of a smart printer mapped to a network access device, according to an exemplary embodiment of the inventive concept.

FIG. 7A is a flow chart showing a method for providing a smart print service of a smart printer mapped to a network access device, according to an exemplary embodiment of the inventive concept.

Referring to FIG. 7A, a global mapping server included in a system according to an exemplary embodiment of the inventive concept maps smart printer information for using a smart printer to identification information of at least one network access devices (710). Here, the smart printer information may include an IP address of a device that processes a received print request. Also, the smart printer information may include an IP address of a printer server that processes a print request. At this time, the global mapping server maps the smart printer information to identification information of the at least one network access devices in response to an input of a request on mapping of the smart printer information to the identification information of the at least one network access devices. This will be more fully described with reference to FIG. 8A.

Also, the global mapping server receives a request on the smart printer information mapped to the identification information of the at least one network access devices from a user wireless device (720). Here, the at least one network access devices may include at least one of a plurality of network access devices that the user wireless device can access at a location where the user wireless device sends the request on the smart printer information. At this time, the global mapping server selects the at least one network access devices in response to the input request on the smart printer information. A procedure where the at least one network access devices are selected may be a procedure where the at least one network access devices are selected based on at least one of NAD selection inputs received from the user wireless device or location information of the user wireless device. Also, the global mapping server receives the request on the mapped smart printer information through a communication path that differs from a communication path between at least one network access device and the user wireless device. Also, the global mapping server receives the request on the mapped smart printer information using a communication protocol that differs from a communication protocol that the at least one network access devices provide.

Also, the global mapping server searches for the smart printer information mapped to the identification information of the at least one network access devices, based on the identification information of the at least one network access devices (730). At this time, the searching for the smart printer information mapped to the identification information of the at least one network access devices may include extracting identification information of a neighboring network access device adjacent to the at least one network access devices based on the identification information of the at least one network access devices and searching for the smart printer information mapped to each of the identification information of the at least one network access devices and the identification information of the neighboring network access device.

Also, the global mapping server provides the user wireless device with the found smart printer information (740). Here, the global mapping server provides the user wireless device with the found smart printer information through a communication path that differs from a communication path between the at least one network access devices and the user wireless device. Also, the global mapping server provides the user wireless device with the found smart printer information using a separate communication protocol that differs from a communication protocol that the at least one network access devices provide. At this time, the global mapping server displays the found smart printer information through a user interface of the user wireless device.

Also, the user wireless device uses a smart printer based on the smart printer information provided from the global mapping server (750).

Figure 7B:
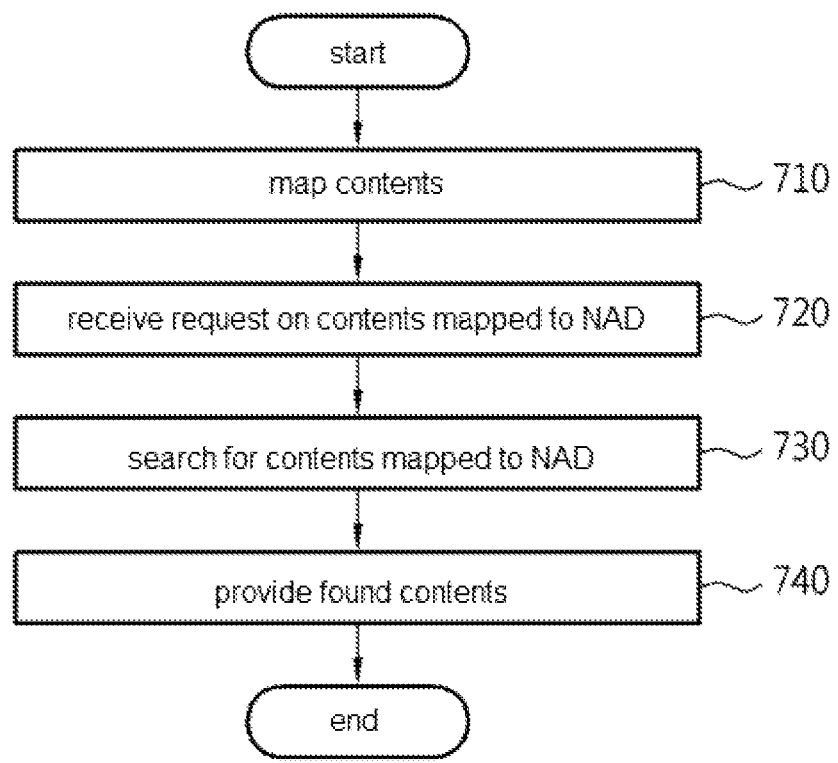
FIG. 7B is a flow chart showing a method for providing contents mapped to a network access device, according to an exemplary embodiment of the inventive concept.

FIG. 7B is a flow chart showing a method for providing contents mapped to a network access device, according to an exemplary embodiment of the inventive concept.

Referring to FIG. 7B, a contents providing server included in a system according to an exemplary embodiment of the inventive concept maps contents to identification information of at least one network access devices prior to providing the mapped contents to the at least one network access devices (710). At this time, a contents providing server maps contents to the identification information of the at least one network access devices in response to an input of a request on mapping of contents to the identification information of the at least one network access devices from a user wireless device. This will be more fully described with reference to FIG. 8B.

Also, the contents providing server receives a request on the contents mapped to the identification information of the at least one network access devices from a user wireless device (720). Here, the at least one network access devices may include at least one of a plurality of network access devices that the user wireless device can access at a location where the user wireless device sends the request on the contents. Also, the contents providing server receives the request on the mapped contents through a communication path between at least one network access device and the user wireless device. Also, the contents providing server receives the request on the mapped contents using a communication protocol that differs from a communication protocol that the at least one network access devices provide. At this time, the contents providing server selects at least one of a plurality of network access devices, based on location information of the user wireless device or at least one of device selection inputs received from the user wireless device.

Also, the contents providing server searches for the contents mapped to the identification information of the at least one network access devices, based on the identification information of the at least one network access device (730). At this time, the searching for the contents mapped to the identification information of the at least one network access devices may include extracting identification information of a neighboring network access device adjacent to the at least one network access devices based on the identification information of the at least one network access devices and searching for the contents mapped to each of the identification information of the at least one network access devices and the identification information of the neighboring network access device.

Also, the contents providing server provides the user wireless device with the found contents (740). Here, the contents providing server provides the user wireless device with the found contents through a communication path that differs from a communication path between the at least one network access devices and the user wireless device. Also, the contents providing server provides the user wireless device with the found contents using a separate communication protocol that differs from a communication protocol that the at least one network access devices provide.

At this time, the contents providing server displays the found contents through a user interface of the user wireless device. Also, the contents providing server provides the user wireless device with other contents by receiving a selection input on specific contents of contents displayed through the user interface of the user wireless device, extracting identification information of a specific network access device, to which the specific contents are mapped, from among the at least one network access devices, and searching for the other contents mapped to the identification information of the specific network access device.

FIG. 8A is a detailed flow chart showing a step of mapping smart printer information to identification information of at least one network access device shown in FIG. 7A.

Referring to FIG. 8A, a global mapping server included in a system according to an exemplary embodiment of the inventive concept receives a request on mapping of smart printer information to identification information of at least one network access devices (810). At this time, the global mapping server acquires the smart printer information and the identification information of the at least one network access devices in response to the received request. Here, the global mapping server may acquire the identification information of the at least one network access devices using a wireless device that differs from the user wireless device or may receive the identification information of the at least one network access devices using the user wireless device.

At this time, the global mapping server acquires the identification information of the at least one network access device from the request on the mapping of the smart printer information to the identification information of the at least one network access devices or may receive the identification information of the at least one network access devices from a device that issues the request on the mapping of the smart printer information to the identification information of the at least one network access devices. Also, the global mapping server obtains the smart printer information from the request on the mapping of the smart printer information to the identification information of the at least one network access devices or receives the smart printer information from a device that issues the request on the mapping of the smart printer information to the identification information of the at least one network access devices.

Also, the global mapping server selects a network access device, which will map the smart printer information, in response to the received request.

Also, the global mapping server extracts identification information of the network access device which will map the smart printer information (820).

Also, the global mapping server receives an input on the smart printer information through a user interface of a user wireless device (830). At this time, the global mapping server automatically obtains smart printer information to be mapped to the extracted identification information of the network access device by loading the smart printer information from a printer server where the smart printer information is stored.

Also, the global mapping server maps the smart printer information to the identification information of the network access device (840).

Herein, although not shown in figures, the global mapping server according to an exemplary embodiment of the inventive concept maps the smart printer information to single identification information, which is generated by combining identification information of the network access device and identification information of a neighboring network access device adjacent to the network access device, and provides the user wireless device with the smart printer information mapped to the single identification information.

The global mapping server maps smart printer information to single identification information through operations including the following:

1) Selecting a network access device, which will map smart printer information, from among at least one network access devices, 2) Extracting identification information of the network access device which will map smart printer information and extracting identification information of a neighboring network access device adjacent to the network access device based on the identification information of the network access device, 3) Receiving an input on smart printer information through a user interface of a user wireless device, 4) Generating single identification information corresponding to the identification information of the network access device by combining the identification information of the network access device and the identification information of the neighboring network access device, and 5) Mapping the smart printer information to the single identification information.

Also, the global mapping server provides the user wireless device with the smart printer information mapped to the single identification information through operations including the following:

1) Receiving a request on smart printer information mapped to identification information of at least one network access devices from a user wireless device, 2) Extracting identification information of a neighboring network access device adjacent to the at least one network access devices based on the identification information of the at least one network access devices, 3) Acquiring single identification information, which is generated by combining the identification information of the at least one network access devices and the identification information of the neighboring network access device, based on the identification information of the at least one network access devices and the identification information of the neighboring network access device, 4) Searching for smart printer information mapped to the single identification information, and 5) Providing a user wireless device with the found smart printer information through a communication path that differs from a communication path between the at least one network access devices and the user wireless device.

Although not shown in figures, also, a global mapping server according to an exemplary embodiment of the inventive concept may receive and map both the identification information of the network access device and the smart printer information from a user interface of the user wireless device.

The global mapping server receives and maps both the identification information of the network access device and the smart printer information from a user interface of the user wireless device through operations including the following:

1) Receiving an input on identification information of a network access device, which will maps smart printer information, from among at least one network access devices and an input on smart printer information through a user interface of a user wireless device, and 2) Mapping the smart printer information to the identification information of the network access device.

Although not shown in figures, also, the global mapping server according to an exemplary embodiment of the inventive concept receives smart printer information, identification information of a network access device, and identification information of a neighboring network access device adjacent to the network access device through the user interface and maps them to single identification information generated by combining the identification information of the network access device and the identification information of the neighboring network access device, which will be performed through operations including the following:

1) Receiving an input on the smart printer information and an input on the identification information of the neighboring network access device adjacent to the network access device through the user interface, 2) Generating single identification information corresponding to the identification information of the network access device by combining the identification information of the network access device and the identification information of the neighboring network access device, and 3) Mapping the single identification information to the smart printer information.

FIG. 8B is a detailed flow chart showing a step of mapping contents to identification information of at least one network access device shown in FIG. 7B.

Referring to FIG. 8B, a contents providing server included in a system according to an exemplary embodiment of the inventive concept receives a request on mapping of contents to identification information of at least one network access devices (810). At this time, the at least one network access devices may include at least one, which a user wireless device accesses at a location where the user wireless device sends a request on mapping contents, from among a plurality of network access devices. Also, the contents providing server receives the request on the mapping of the contents to the identification information through a communication path that differs from a communication path between the at least one network access devices and the user wireless device. Also, the contents providing server receives the request on the mapping of the contents to the identification information using a separate communication protocol that differs from a communication protocol that the at least one network access devices provide.

Also, the contents providing server extracts identification information of the network access device which will map the contents using the user wireless device (820). For example, the contents providing server may extract identification information of at least one of a plurality of network access devices that the user wireless device can access.

Also, the contents providing server receives an input on the contents through a user interface of the user wireless device (830).

Also, the contents providing server maps the contents to identification information of a network access device and stores the mapped information (840).

Here, although not shown in figures, the contents providing server according to an exemplary embodiment of the inventive concept maps the contents to single identification information, which is generated by combining identification information of the network access device for mapping and identification information of a neighboring network access device adjacent to the network access device, and provides the user wireless device with the contents mapped to the single identification information.

The contents providing server maps contents to the single identification information through operations including the following:

1) Extracting identification information of the network access device which will map contents and extracting identification information of the neighboring network access device adjacent to the network access device based on the identification information of the network access device, 2) Receiving an input on contents through a user interface of a user wireless device, 3) Generating single identification information corresponding to the identification information of the network access device by combining the identification information of the network access device and the identification information of the neighboring network access device, and 4) Mapping the contents to the single identification information and storing the mapped information.

Also, the contents providing server provides the user wireless device with the contents mapped to the single identification information through operations including the following:

5) Receiving a request on contents mapped to identification information of at least one network access devices from the user wireless device, 6) Extracting identification information of the neighboring network access device adjacent to the at least one network access devices based on the identification information of the at least one network access device, 6) Acquiring single identification information, which is generated by combining the identification information of the at least one network access devices and the identification information of the neighboring network access device, based on the identification information of the at least one network access devices and the identification information of the neighboring network access device, 7) Searching for contents mapped to the single identification information, and 8) Providing the user wireless device with the found contents.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing content mapped to a network access device, comprising:
   receiving, at a server device, a request for content from a user wireless device, wherein each of one or more sets of content are mapped to identification information of at least one network access device;
   searching, by the server device, for a set of content mapped to the identification information of the at least one network access device based on at least one of: (i) a distance from the at least one network access device to the user wireless device or (ii) a selection of the at least one network access device by the user wireless device; and
   providing, by the server device, the set of content to the user wireless device.

2. The method of claim 1, wherein providing the set of content includes:

providing, by the server device, the set of content to the user wireless device through a communication path that differs from a communication path between the at least one network access device and the user wireless device.

3. The method of claim 1, wherein providing the set of content includes:
providing, by the server device, the set of content to the user wireless device using a separate communication protocol that differs from a communication protocol that the at least one network access device provides.

4. The method of claim 1, wherein receiving a request includes:
receiving, at the server device, a request for the mapped set of content through a communication path that differs from a communication path between the at least one network access device and the user wireless device.

5. The method of claim 1, wherein receiving a request includes:
receiving, at the server device, a request for the mapped set of content using a separate communication protocol that differs from a communication protocol that the at least one network access devices provides.

6. The method of claim 1, wherein searching for content mapped to the identification information includes:
extracting, by the server device, identification information of a neighboring network access device adjacent to the at least one network access device, based on the identification information of the at least one network access device; and
searching, by the server device, for a set of content mapped to each of the identification information of the at least one network access device and the identification information of the neighboring network access device.

7. The method of claim 1, wherein providing the set of content includes:
receiving, at the server device, a selection input on a subset of the set of content displayed through a user interface of the user wireless device;
extracting, by the server device, identification information for a network access device from among the at least one network access device to which the subset of the content is mapped;
searching, by the server device, for other content mapped to the identification information of the network access device and different from the subset of the content; and
providing, by the server device, the other content to the user wireless device.

8. The method of claim 1, further comprising:
mapping, by the server device, the set of content to the identification information of the at least one network access device.

9. The method of claim 8, wherein mapping the set of content includes:
receiving, at the server device, a request to map the set of content to the identification information of the at least one network access device from the user wireless device or any other wireless device.

10. The method of claim 9, wherein the at least one network access device includes a plurality of network access devices and the user wireless device accesses one of the plurality of network access devices at a location where the user wireless device sends the request to map the set of content.

11. The method of claim 9, wherein receiving a request to map the set of content to the identification information of the at least one network access device includes:
receiving, at the server device, a request to map the set of content to the identification information through a communication path that differs from a communication path between the at least one network access device and the user wireless device.

12. The method of claim 9, wherein receiving a request to map the set of content to the identification information of the at least one network access device includes:
receiving, at the server device, a request to map set of content to the identification information using a separate communication protocol that differs from a communication protocol that the at least one network access device provides.

13. A method for providing a smart print service of a smart printer mapped to a network access device, comprising:
mapping, by a server device, identification information for at least one network access device to smart printer information for a smart printer based upon a distance from the at least one network access device to the smart printer;
receiving, at the server device, a request for smart printer information from a user wireless device;
searching, by the server device, for the smart printer information mapped to identification information of the at least one network access device based on at least one of: (i) a distance from the at least one network access device to the user wireless device or (ii) a selection of the at least one network access device by the user wireless device; and
providing, by the server device, the smart printer information to the user wireless device for the smart printer mapped to the at least one network access device.

14. The method of claim 13, wherein providing the smart printer information includes:
providing the smart printer information to the user wireless device through a communication path that differs from a communication path between the at least one network access device and the user wireless device.

15. The method of claim 13, wherein providing the smart printer information includes:
providing the smart printer information to the user wireless device using a separate communication protocol that differs from a communication protocol that the at least one network access device provides.

* * * * *